US009940651B2

(12) United States Patent
Ross et al.

(10) Patent No.: US 9,940,651 B2
(45) Date of Patent: *Apr. 10, 2018

(54) SELECTING VEHICLE TYPE FOR PROVIDING TRANSPORT

(71) Applicant: Uber Technologies, Inc., San Francisco, CA (US)

(72) Inventors: William Ross, Pittsburgh, PA (US); John Bares, Pittsburgh, PA (US); David LaRose, Pittsburgh, PA (US); Matthew Sweeney, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,521

(22) Filed: Dec. 2, 2016

(65) Prior Publication Data
US 2017/0083957 A1    Mar. 23, 2017

Related U.S. Application Data

(63) Continuation of application No. 14/711,602, filed on May 13, 2015, now Pat. No. 9,547,309.

(51) Int. Cl.
*G06Q 10/02* (2012.01)
*G08G 1/123* (2006.01)
(Continued)

(52) U.S. Cl.
CPC ..... *G06Q 30/0283* (2013.01); *G01C 21/3407* (2013.01); *G01C 21/3484* (2013.01); *G01C 21/3492* (2013.01); *G05D 1/0027* (2013.01); *G05D 1/0088* (2013.01); *G05D 1/0217* (2013.01); *G05D 1/0234* (2013.01); (Continued)

(58) Field of Classification Search
CPC .... G05D 1/0027; G05D 1/0024; G06G 10/02; G06Q 30/0283; G08G 1/123; G06K 9/00791; B60W 50/10
See application file for complete search history.

(56) References Cited

U.S. PATENT DOCUMENTS 6,542,111 B1    4/2003    Wilson
6,795,031 B1    9/2004    Walker
(Continued)

FOREIGN PATENT DOCUMENTS

DE    102006034129    1/2008
JP    2014-211862    11/2014
(Continued)

OTHER PUBLICATIONS

ISR and Written Opinion dated Feb. 16, 2017 in PCT/US2016/063203.
(Continued)

*Primary Examiner* — Yuri Kan
(74) *Attorney, Agent, or Firm* — Mahamedi IP Law LLP

(57) ABSTRACT

A transport arrangement system operates to receive a transport request from a user, and to make a selection of a vehicle type for the user based at least in part on a set of criteria associated with the transport request or user information. For example, the determination of whether an autonomous vehicle is to be provided can be based at least in part on the destination specified with the transport request.

54 Claims, 12 Drawing Sheets

(51) Int. Cl.

| | | |
|---|---|---|
| *B60W 50/10* | (2012.01) | |
| *G06Q 30/02* | (2012.01) | |
| *G05D 1/02* | (2006.01) | |
| *G01C 21/34* | (2006.01) | |
| *G05D 1/00* | (2006.01) | |
| *G06Q 50/30* | (2012.01) | |

(52) U.S. Cl.
CPC ..... *G06Q 50/30* (2013.01); *G05D 2201/0212* (2013.01); *G05D 2201/0213* (2013.01)

(56) References Cited

U.S. PATENT DOCUMENTS

| | | |
|---|---|---|
| 8,630,897 B1 | 1/2014 | Prada Gomez |
| 8,676,430 B1 | 3/2014 | Ferguson |
| 8,825,265 B1 | 9/2014 | Ferguson |
| 9,194,168 B1 | 11/2015 | Lu |
| 9,317,033 B2 | 4/2016 | Ibanez-Guzman |
| 9,384,402 B1 | 7/2016 | Furman |
| 9,436,182 B2 | 9/2016 | Nemec |
| 9,494,439 B1 | 11/2016 | Ross |
| 9,547,307 B1 | 1/2017 | Cullinane |
| 9,547,985 B2 | 1/2017 | Tuukkanen |
| 9,552,564 B1 | 1/2017 | Martenis |
| 2002/0026281 A1* | 2/2002 | Shibata ............... G08G 1/123 701/29.1 |
| 2008/0059007 A1 | 3/2008 | Whittaker et al. |
| 2008/0086241 A1 | 4/2008 | Phillips |
| 2008/0215202 A1 | 9/2008 | Breed |
| 2009/0140887 A1 | 6/2009 | Breed |
| 2009/0248231 A1 | 10/2009 | Kamiya |
| 2010/0082195 A1 | 4/2010 | Lee |
| 2010/0201829 A1 | 8/2010 | Skoskiewicz |
| 2010/0256836 A1 | 10/2010 | Mudalige |
| 2011/0125395 A1 | 5/2011 | Mathews |
| 2012/0101660 A1 | 4/2012 | Hattori |
| 2013/0085817 A1 | 4/2013 | Pinkus |
| 2013/0090802 A1* | 4/2013 | Curtis .................. G05D 1/024 701/25 |
| 2013/0099892 A1 | 4/2013 | Tucker |
| 2013/0158795 A1 | 6/2013 | Hahne |
| 2013/0190964 A1 | 7/2013 | Uehara |
| 2013/0246207 A1* | 9/2013 | Novak ............... G06Q 30/0283 705/26.2 |
| 2014/0028440 A1 | 1/2014 | Takeuchi |
| 2014/0067488 A1 | 3/2014 | James |
| 2014/0121964 A1 | 5/2014 | Stanley |
| 2014/0172727 A1 | 6/2014 | Abhyanker |
| 2014/0365258 A1 | 12/2014 | Vestal |
| 2015/0006005 A1 | 1/2015 | Yu |
| 2015/0104071 A1* | 4/2015 | Martin ............... G06K 9/00791 382/104 |
| 2015/0106010 A1 | 4/2015 | Martin |
| 2015/0178998 A1 | 6/2015 | Attard |
| 2015/0248131 A1 | 9/2015 | Fairfield et al. |
| 2015/0339928 A1 | 11/2015 | Ramanujam |
| 2016/0033963 A1 | 2/2016 | Noh |
| 2016/0054140 A1 | 2/2016 | Breed |
| 2016/0117610 A1* | 4/2016 | Ikeda .................... G06Q 10/02 705/5 |
| 2016/0189098 A1 | 6/2016 | Beaurepaire |
| 2016/0209220 A1 | 7/2016 | Laetz |
| 2017/0267256 A1* | 9/2017 | Minster ................ B60W 50/10 |

FOREIGN PATENT DOCUMENTS

| | | |
|---|---|---|
| WO | WO2006011158 A2 | 2/2006 |
| WO | WO 2015-157974 | 10/2015 |
| WO | WO2015169204 | 11/2015 |

OTHER PUBLICATIONS

ISR and Written Opinion dated Aug. 11, 2016 in PCT/US2016/032549.

ISR and Written Opinion dated Sep. 14, 2017 in PCT/US2017/034819.

Rigole, Pierre-Jean, "Study of a Shared Autonomous Vehicles Based Mobility Solution in Stockholm", Master of Science Thesis, Stockholm, 2014.

Zachariah, Jaison J., "Are We There Yet? A Proposal for an Autonomous Taxis System in New Jersey and a Preliminary Foundation for Empty Vehicle Routing", BSE Publication, Princeton University, Jun. 2013.

Office Action dated Feb. 8, 2018 in U.S. Appl. No. 15/849,432.

Office Action dated Feb. 9, 2018 in U.S. Appl. No. 15/849,462.

* cited by examiner

SELECTING VEHICLE TYPE FOR PROVIDING TRANSPORT

CROSS-REFERENCE TO RELATED APPLICATIONS

This application is a continuation of U.S. patent application Ser. No. 14/711,602, filed May 13, 2015, which application is hereby incorporated by reference in its entirety.

BACKGROUND

Autonomous vehicles currently exist in experimental or prototypical form. These vehicles replace human drivers with sensors and computer-implemented intelligence. Under existing technology, autonomous vehicles can readily handle driving with other vehicles on roadways such as highways. However, urban settings can pose challenges to autonomous vehicles, in part because crowded conditions can cause errors in interpretation of sensor information.

DETAILED DESCRIPTION

Figure 1:
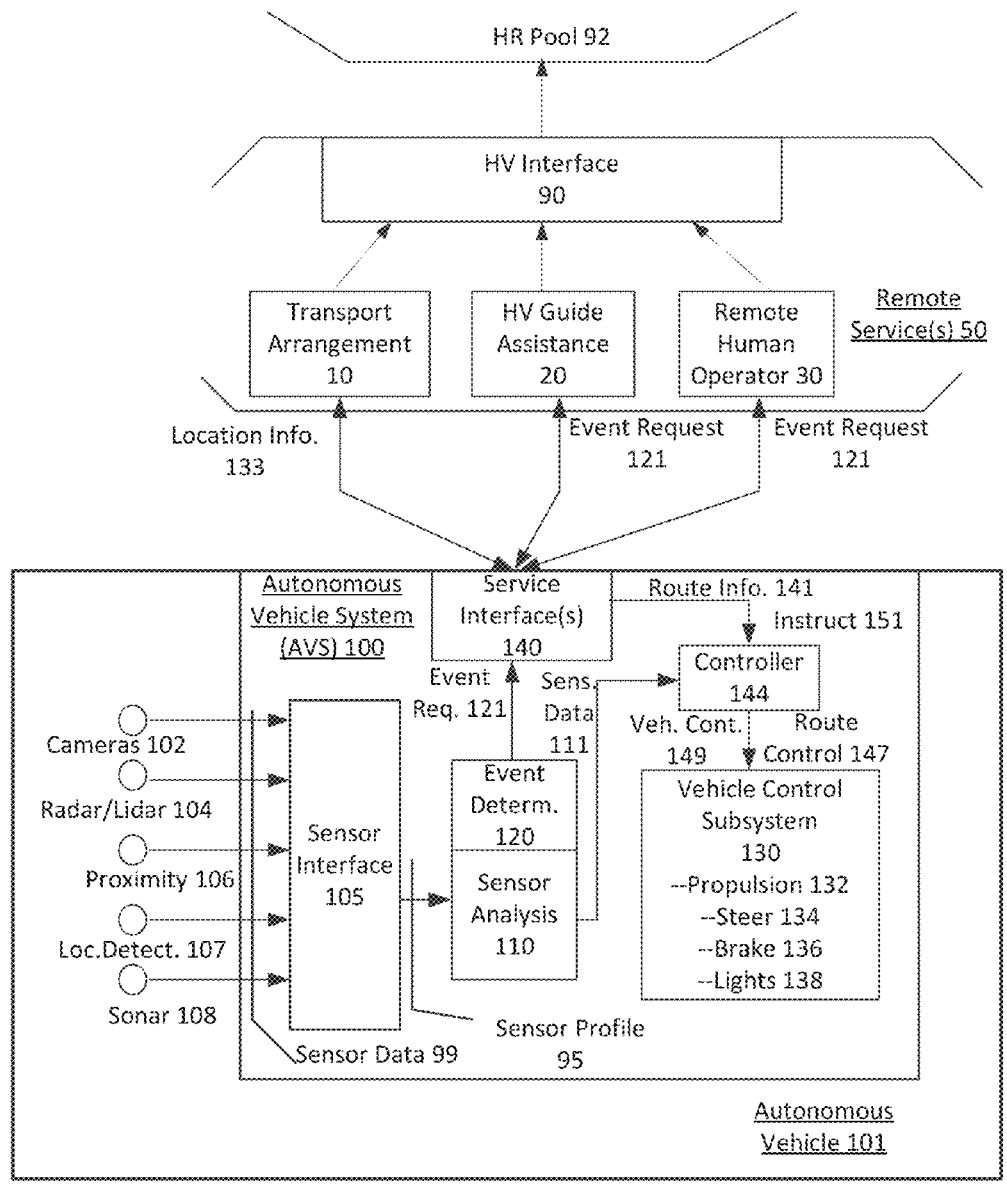
FIG. 1 illustrates various examples of hybrid services which utilize autonomous vehicles along with human operators, according to embodiments.

According to some examples, an autonomous vehicle is operated under guide assistance of a human driven vehicle. In one aspect, guide assistance from a human driven vehicle is provided when a determination is made that the autonomous vehicle cannot progress safely on its route. For example, the autonomous vehicle may encounter construction, a public event, or a situation which is not detected properly with sensors or not understood by the onboard intelligence of the vehicle. In such situations, some examples described provide for the autonomous vehicle to be paired with a human driven vehicle to guide it through a trip segment which the autonomous vehicle does not understand.

In some examples, a confidence level is determined for the autonomous vehicle which is indicative of an ability of the autonomous vehicle to safely progress on a planned or current route to a destination. When the confidence level is determined to be below a threshold value, a human driven vehicle is selected to guide the autonomous vehicle through at least a portion of the planned or current route. The autonomous vehicle can be controlled to track the second vehicle while progressing through the portion of the planned or current route.

Still further, in some examples, human driven vehicles can be selected to assist autonomous vehicles by collecting information about roadways and road conditions which could otherwise impede the ability of the autonomous vehicles to safely progress. According to an aspect, a human driven vehicle can be equipped with a set of sensors which can obtain sensor information of select roadways. The sensor information from the human driven vehicle can be used to determine when road segments have road conditions which have a sufficiently high likelihood of impairing an autonomous vehicle in safely navigating through the one or more road segments. Information can be determined from the sensor information for assisting autonomous vehicles to guide through the road segments which have been determined to have road conditions. The information can include, for example, instructions for navigating the autonomous vehicle, or instructions for enabling the autonomous vehicle to interpret the sensor information.

Other examples include a system to arrange transport services for a user, in which an intelligent decision is made as to whether the vehicle for providing the transport is to be human driven or autonomous. In one aspect, a transport arrangement system operates to receive a transport request from a user, and to make a selection of a vehicle type for the user based at least in part on a set of criteria associated with the transport request or user information. For example, the determination of whether an autonomous vehicle is to be provided can be based at least in part on the destination specified with the transport request.

Among other benefits, some examples described herein recognize that roadways in general, and urban thoroughfares in particular, pose the challenge to autonomous vehicles of the unknown condition or event. Among benefits and technical effects achieved with examples as described, a service can link an autonomous vehicle with a human driven vehicle in order to facilitate the autonomous vehicle in navigating through a roadway that poses a relatively unknown or challenging condition. The autonomous vehicle can thus simplify its own operations by simply tracking another vehicle, rather than attempting to navigate an unknown or challenging condition.

According to another example, a system provides human assistance to autonomous vehicles. According to one aspect, an event is detected that impairs a confidence level of the autonomous vehicle in progressing through a current route. In response to detecting the event, the autonomous vehicle communicates information about the event to a remote source of guidance. The autonomous vehicle can receive instructions from the remote source of guidance on how to handle the event. The autonomous vehicle can then implement the instructions to handle the event while it operates.

According to some variations, a service of human operators can be implemented as a remote source of guidance for a vehicle. A human interface can be generated for a terminal of an operator in order to display information that is relevant to an event that is detected by the vehicle. In some variations, a user interface can display predetermined options from which the operator can make selection, and the selected option can then be converted to instructions for the autonomous vehicle in its handling of the event.

As used herein, a client device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A driver device can also correspond to custom hardware, in-vehicle devices, or on-board computers, etc. The client device and/or the driver device can also operate a designated application configured to communicate with the service arrangement system.

While some examples described herein relate to transport services, the service arrangement system can enable other on-demand location-based services (for example, a food truck service, a delivery service, an entertainment service) to be arranged between individuals and service providers. For example, a user can request an on-demand service, such as a delivery service (e.g., food delivery, messenger service, food truck service, or product shipping) or an entertainment service (e.g., mariachi band, string quartet) using the system, and the system can select a service provider, such as a driver or a vehicle, food provider, band, etc., to provide the on-demand service for the user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates various examples of hybrid services which utilize autonomous vehicles along with human operators, according to embodiments. In an example of FIG. 1, an autonomous vehicle system ("AVS 100") includes a computer or processing system which operates to process sensor information on the vehicle in order to interface and control an autonomous vehicle 101. Additionally, the AVS 100 can include other functionality, including wireless communication capabilities in order to send and/or receive wireless communications with one or more remote sources, such as provided by remote services 50 of FIG. 1. In controlling the autonomous vehicle 101, the AVS 100 can issue instructions and data which programmatically control various electro-mechanical interfaces of the vehicle, in order to control aspects of vehicle motion such as propulsion, braking, steering, and auxiliary behavior (e.g., turning lights on).

In an example of FIG. 1, the AVS 100 communicates with any one of multiple possible remote services 50 in order to provide a hybrid service or functionality which combines the use or operation of an autonomous vehicle 101 with human controlled resources. A resulting hybrid service or function of the autonomous vehicle 101 recognizes many shortcomings of autonomous vehicles in general, particularly when such vehicles are used in the context of transport services.

In particular, some embodiments as described anticipate that autonomous vehicles, as developed to production from their current form, will be relatively uncomfortable carriages of human transport (as compared to human driven vehicles) for everyday urban use. Specifically, some embodiments recognize that autonomous vehicles have a tendency or need to stop or slow down frequently in order to process their surroundings and to recognize objects, events or conditions. The braking and variable speed behavior of such vehicles results in an uncomfortable experience for passengers.

Moreover, urban driving environments pose significant challenges to autonomous vehicles. In urban environments, events such as road construction, public events, road obstructions, and emergencies continuously demand driver attention and recognition of the driving environment. Examples provided herein recognize that the effectiveness of autonomous vehicles in urban settings can be limited by the limitations of autonomous vehicles in recognizing and understanding how to handle the numerous daily events of a congested environment.

In an example of FIG. 1, remote services 50 can include services accessible to the autonomous vehicle 101 over one or more networks, such as cellular/Internet networks. The remote services 50 leverage human resources to address shortcomings of autonomous vehicles, as recognized by embodiments described herein, when such vehicles are used with transport services. In an example of FIG. 1, remote services 50 include a transportation arrangement service 10, a human vehicle guide assistance service 20, and a remote human operator assistance service 30. Each of the transportation arrangement service 10, human vehicle guide assistance service 20, remote human operator assistance service 30 or other network service can include or otherwise use a corresponding human operator interface 90. As described with various examples, the human operator interface 90 of each remote service 50 can access and leverage a human resource pool 92 for purpose of hybridizing the service provided with the autonomous vehicle 101. Among other functions, the human operator interface 90 can coordinate and otherwise leverage human resources for purpose of facilitating operation and use of the autonomous vehicle 101.

According to some examples, autonomous vehicle 101 includes the AVS 100, as well as a collection of sensors for enabling the AVS to perceive its surroundings and environment. The sensors of the autonomous vehicle 101 communicate with the AVS 100 to provide a computerized perception of the space and environment surrounding the autonomous vehicle 101. Likewise, the AVS 100 can operate within the autonomous vehicle 101 to receive sensor data from the collection of sensors, and to control various electromechanical interfaces for operating the vehicle on roadways.

According to one aspect, the AVS 100 includes one or more sensor interface components 105, a sensor analysis component 110, a vehicle interface (or control) subsystem 130, and a controller 144. The sensor analysis component 110 includes event determination logic 120 to detect events and conditions on the roadway on which the autonomous vehicle 101 travels.

The plurality of sensors 102, 104, 106, 108 operate to collectively obtain a complete sensor view of the vehicle, and further obtain information about what is near the vehicle, as well as what is near or in front of a path of travel for the vehicle. By way of example, the plurality of sensors 102, 104, 106, 108 include multiple sets of cameras sensors 102 (video camera, stereoscopic pairs of cameras or depth perception cameras, long range cameras), remote detection sensors, such as provided by radar or Lidar 104, proximity or touch sensors 106, and/or sonar sensors 108. Still further, the autonomous vehicle 101 can also include location detection resources 107 to determine (periodically) the current location of the autonomous vehicle 101. By way of example, the location detection mechanism(s) 107 provided with the autonomous vehicle 101 can include wireless transceivers and/or wireless signal processing, Global Position System (GPS) resources or other satellite location receivers. In some variations, the sensor interface 105 can include logic to implement signal or sensor processing to determine location information, such as by way of visual odometry, landmark recognition, and/or sensor motion processing and mapping.

The sensor interface 105 receives raw sensor data 99 from the various sensors 102, 104, 106, 108. The raw sensor data 99 can collectively represent an output signal or communication from the variety of sensors which are provided with the AVS 100. The sensor interface 105 can process raw sensor data 99 in order to generate a sensor profile set 95. The sensor profile set 95 can be subjected to one or more processes of sensor analysis component 110. The processes of sensor analysis component 110 operate to generate sensor data 111, which can be processed as, for example, a parametric or instructional input for other components of the AVS 100. The sensor data 111 can be received by the controller 144 in order to control the various vehicle interfaces of the autonomous vehicle 101.

In more detail, the vehicle interface subsystem 130 can include or control multiple vehicle interfaces, including a propulsion interface 132, a steering interface 134, a braking interface 136, and lighting/auxiliary interface 138, and/or other interfaces for vehicle operation. The controller 144 can provide vehicle control signals 149 to multiple vehicle interfaces at one time, so as to control propulsion, steering, braking and other vehicle behavior while the autonomous vehicle 101 follows a route. Thus, while the autonomous vehicle 101 may follow a route, the controller 144 can continuously adjust and alter the movement of the vehicle in response to receiving the sensor data 111. Absent events or conditions which affect the confidence of the vehicle in safely progressing on the route, the controller 144 can process sensor data 111 in order to generate various vehicle control signals 149 for the different interfaces of the vehicle interface subsystem 130.

The autonomous vehicle 101 can be used with a variety of remote services 50 which also utilize or incorporate human resources. By way of example, the autonomous vehicle 101 can be used as part of a fleet of vehicles that provide transport services. In such contexts, remote services 50 can include transportation arrangement service 10, which arranges transportation for transport requests that are made by users or customers. When the autonomous vehicle 101 is operated as a transportation provider, the transportation arrangement service 10 can receive location information 133 from the autonomous vehicle 101 (e.g., detected by the GPS receiver), and further communicate route information 141 to the AVS 100. The route information 141 can be received by the AVS 100 via the service interface 140. The controller 144 can process the route information 141 in order to control the vehicle interface system 130 in steering or otherwise moving the vehicle in accordance with the route specified by the route information 141. In this way, the autonomous vehicle 101 can progress on a trip to fulfill a transport request made through the transport arrangement service 10. For example, the autonomous vehicle 101 can progress on a trip from, for example, a pickup or service location, to a drop-off or other service location using route information 141 provided from the transport arrangement service 10. A more detailed example of transportation arrangement service 10 is provided with an example of FIG. 3.

The event determination logic 120 may operate to detect events or conditions which have lowered levels of confidence in terms of the vehicle's understanding. In one implementation, event determination logic 120 can generate a confidence score or value for individual events or conditions which are detected from the sensor data 111. The confidence score or value can correlate to an indication of how safely the AVS 100 is able to handle the event or condition. For example, if the event corresponds to the occurrence of rain, or the appearance of a large pothole in the road, the confidence score as determined by event determination logic 120 can be relatively high, meaning the AVS 100 has a confident understanding of what the event or condition is, and also on how to respond (e.g., ignore the event, change lanes if possible, etc.) to the event. The event determination logic 120 can determine when an event or condition results in a confidence value that is below a threshold. The threshold can be selected by implementation or design to signify the point where the understanding of the AVS 100 of the event or condition, and/or the action that should be undertaken by the autonomous vehicle 101, is too low for reliance.

The event determination logic 120 can generate an event request 121 in response to a determination that an event or condition (including how the vehicle should respond to the event or condition) is inadequately understood. Additionally, the event determination logic 120 can generate the event request 121 if the event determination logic 120 determines that a planned or likely action to an event or condition has a relatively low confidence score. For example, the autonomous vehicle may plan to swerve left for safety, but the sensor data 111 may see loose dirt in the open space, resulting in uncertainty as to whether the planned or likely maneuver is safe.

The AVS 100 can communicate the event request 121 to one or more remote services 50, such as (i) human vehicle guide assistance service 20 or (ii) remote human operator assistance service 30. The human vehicle guide assistance service 20 or remote human operator assistance service 30 can provide different forms of human assistance from a human resource pool 92 in order to facilitate the autonomous vehicle 101 in understanding the event or condition.

According to one implementation, the event request 121 can be provided to human vehicle guide assistance service 20, which in turn can trigger human operator interface 90 to make a selection of a human driven vehicle. The human operator interface 90 can, for example, correspond to a dispatch system for a transport service in which human driven vehicles are utilized. Examples recognize that human driven vehicles are advantageous for many reasons, including because as transport providers, the route, current and/or future location of such vehicles is known. For example, the human operator interface 90 can operate as part of a transport service which dispatches human driven vehicles to service locations, such as to pick up passengers and packages, and to transport passengers or packagers to drop off or service locations. Thus, the route of the human driven vehicle can be known at a given instance of time.

Figure 2:
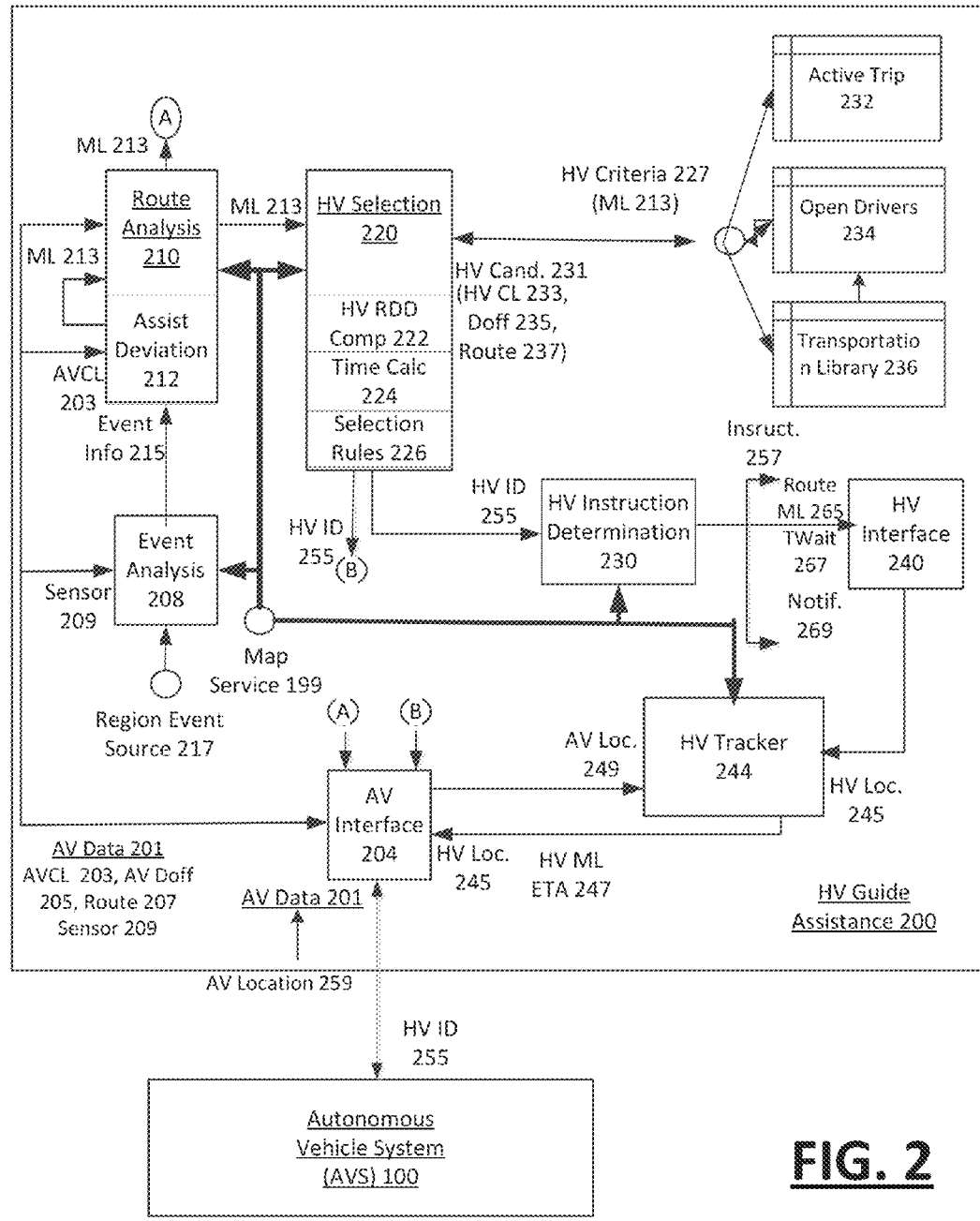
FIG. 2 illustrates an example system for providing a human driven vehicle as a guide assistant to an autonomous vehicle.

As described with an example of FIG. 2, the human vehicle guide assistance service 20 can utilize human operator interface 90 in order to identify human operators who are driving vehicles on active trips in order to fulfill transport requests, as well as human operators whom are available to field transport requests. As described with an example of FIG. 2, the human vehicle guide assistance service 20 can pair a human driven vehicle with the autonomous vehicle 101 when, for example, the event determination logic 120 determines it has relatively low confidence (e.g., confidence value below an acceptable threshold) in how to safely handle an event or condition. When paired, the autonomous vehicle 101 can receive route information 141 and/or instructions 151 for (i) meeting a human driven vehicle that is to serve as a guide, and (ii) tracking the human driven vehicle through a road segment that is problematic to the autonomous vehicle 101. The route information 141 and/or instructions 151 can be implemented by the controller 144 as route control input 147 and/or vehicle control input 149. For example, the vehicle interface subsystem 130 can generate the route control input 147 and/or vehicle control input 149 to propel, steer and brake the vehicle (e.g., to meet the human driven vehicle and to follow the human driven vehicle). In this way, the AVS 100 can receive and act on route information 141 and/or instructions 151 by generating corresponding control signals for the vehicle interface subsystem 130, so as to cause the autonomous vehicle 101 to track the human driven vehicle that is selected as a guide by the human vehicle guide assistance service 20.

As an addition or an alternative, human vehicle guide assistance service 20 can receive route information from the transport arrangement service 10 that the autonomous vehicle 101 is to take. Based on information about the difficulty of certain portions of the route, the human vehicle guide assistance service 20 can pair a human driven vehicle with the autonomous vehicle 101. Using location data received from the vehicles, the human vehicle guide assistance service 20 can determine which human driven vehicle will be traveling along the same difficult portions of the route, so that the human driven vehicle can be used as the guide vehicle for the autonomous vehicle 101, and provide the route information 141 and/or instructions 151 to the autonomous vehicle.

In variations, event request 121 can be communicated to remote human operator assistance service 30. The remote human operator assistance service 30 communicates with one or more remote human operators, who facilitates remote guidance for the autonomous vehicle 101 by providing the autonomous vehicle 101 with real-time instructions for handling events or conditions that are deemed as safety concerns (e.g., those events for which the event determination logic 120 determines the safety confidence value or score to be below a threshold). As an alternative or addition, the remote guidance can provide real-time instructions to the autonomous vehicle 101 to facilitate the autonomous vehicle 101 in performing an optimal or appropriate action, such as (i) identification of a location to drop off a passenger, (ii) a driving lane to occupy for optimal arrival time (or safety or comfort etc.), or (iii) an action for which an outcome is unknown to the autonomous vehicle, such as driving forward to an electronic gate which will automatically slide open once the vehicle is in proximity.

In examples described, the remote human operator assistance service 30 can be provided for events or conditions which require immediate input from a remote human operator. As described with an example of FIG. 4, the remote human operator can provide input which is received by AVS 100 as instructions. The input provided by the remote human operator may be received as route information 141 or instructions 151. The controller 144 can use the input to control the vehicle interface subsystem 130 and its various interfaces, so as to handle the event or condition with minimal interruption.

Figure 4:
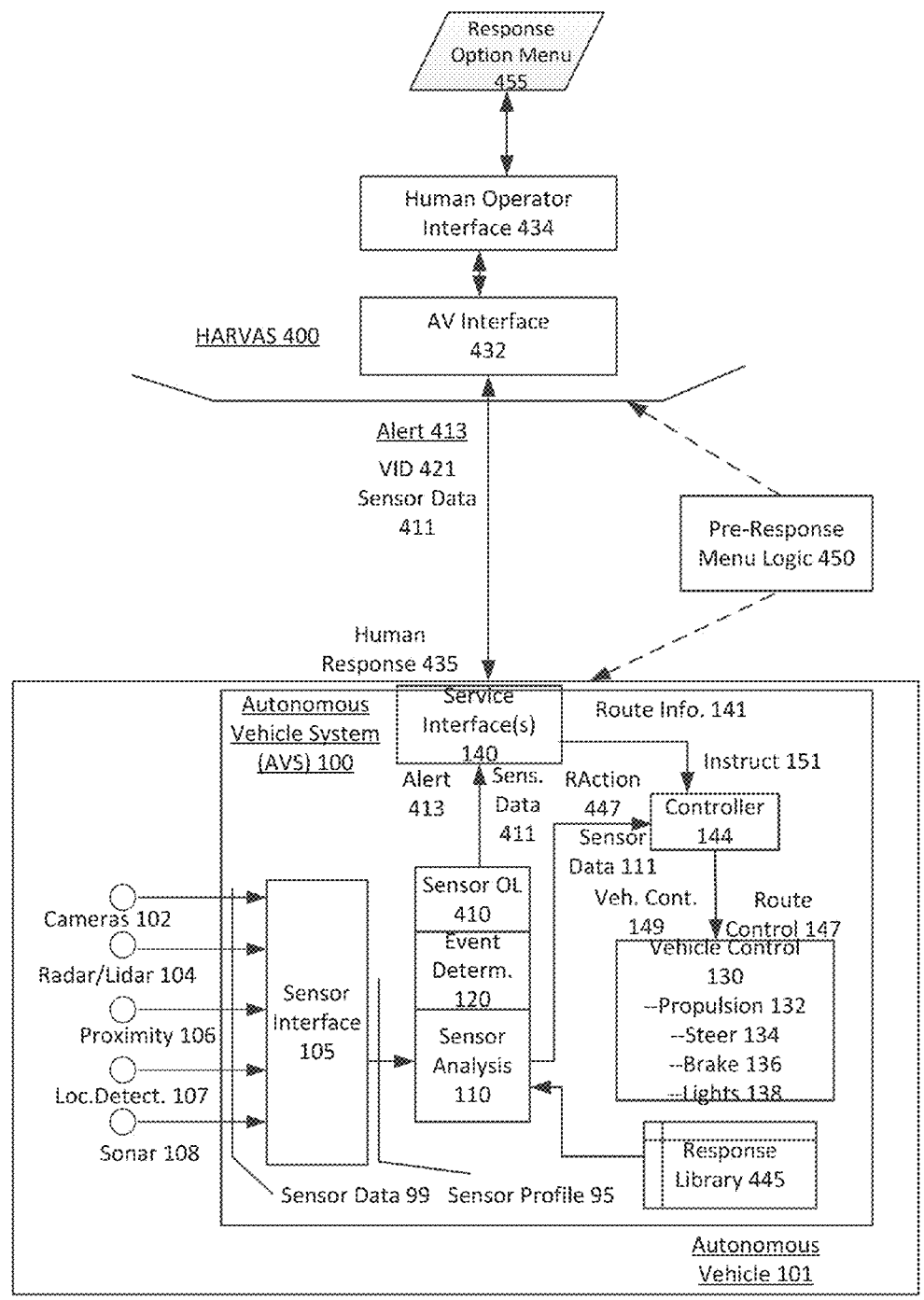
FIG. 4 illustrates an example system for using human operators to instruct autonomous vehicles on handling and/or understanding of events or conditions of a roadway.

As described with an example of FIG. 4, examples recognize that autonomous vehicles can be uncomfortable modes of transport for human passengers because the vehicles slow down and stop considerably more than human driven counterparts. Autonomous vehicles in generate utilize seconds of time, for example, to process and understand a road condition or event. According to examples, the implementation and use of remote human operator assistance service 30 provides a solution for addressing the inherent nature of autonomous vehicles to operate cautiously and make passengers uncomfortable with braking behavior and slow progression when relatively known events or conditions or encountered. Rather, remote human operator assistance service 30 facilitates the autonomous vehicle 101 in progressing on a trip by mitigating the need for the autonomous vehicle to brake, slow down or stop when events or conditions are encountered.

Human Vehicle Guide Assistance System

FIG. 2 illustrates an example system for providing a human driven vehicle as a guide assistant to an autonomous vehicle. A human vehicle guide assistance system 200 can implement a corresponding service, such as described with HV guide assistance service 20 of FIG. 1. In an example of FIG. 2, the human vehicle guide assistance system 200 includes autonomous vehicle interface ("AV interface 204"), event analysis 208, route analysis component 210, human vehicle selection component ("HV selection component 220"), human vehicle instruction determination component ("HV selection instruction determination component 230"), human vehicle interface ("HV interface 240"), and human vehicle tracker ("HV tracker 244"). The AV interface 204 communicates with AVS 100 of the autonomous vehicle 101, as described with an example of FIG. 1. The AV interface 204 receives event request 121, indicating that the AVS 100 has detected an event or condition which the AVS 100 does not know (with sufficient confidence) how to handle. The event request 121 can be provided with autonomous vehicle data ("AV data 201"), which includes different types of data obtained from the AVS 100. In particular, AV data 201 can include the current location of the autonomous vehicle 101 ("AV CL 203"), the planned drop off or service location (e.g., stopping point) of the autonomous vehicle ("AV Doff 205"), the planned route for the autonomous vehicle 101 ("route information 207"), and various types of sensor information (collectively "sensor information 209"). A map service 199 can be integrated or otherwise provided with various components of system 200. For example, the map service 199 can be integrated or provided with the event analysis component 208, the route analysis component 210, the HV selection component 220, the HV instruction determination component 230, and/or the HV tracker 244.

The event analysis component 208 may operate to develop an understanding of the event or condition which triggered the event request 121. For example, the event analysis 208 can process sensor information 209 in the context of position information of the autonomous vehicle 101. The event analysis 208 can reference position information of the autonomous vehicle 101 against map service 199, in order to determine context for the event request 121. In some examples, a region-specific information source 217 can record location-based information about a region, and a combination of sensor information 209, as well as position information of the autonomous vehicle 101 (e.g., as provided by AV CL 203) can be correlated into contextual information about the event ("contextual or event information 215"). By way of example, contextual information 215 can include labels or descriptors, or numeric equivalents or correlations of parameters, which indicate one or more of the following: road construction, pedestrian traffic, emergency situation, extraordinary traffic, etc.

The route analysis component 210 can operate to determine where the autonomous vehicle 101 should go until a human driven guide is located and provided to the autonomous vehicle 101. For example, route analysis component 210 can determine that the autonomous vehicle 101 should remain in the current location (AV CL 203), or alternatively, locate the first available street parking or other space where the autonomous vehicle 101 can wait for the arrival of the human driven guide vehicle. Examples recognize, however, that in urban settings, particularly where event requests 121 are likely to be generated, the possibility of the autonomous vehicle 101 remaining on course or at its current location pending assistance is not always feasible or practical. The route analysis component 210 can include route (or assist) deviation component 212, which determines a meeting place or meetup location ("ML 213") where the autonomous vehicle 101 can safely wait and then follow or otherwise track a human driven guide vehicle. The route deviation component 212 can include logic which queries the map service 199 for parking information that is in proximity to the autonomous vehicle's current location (AV CL 203). The route analysis component 210 can determine a route from the AV CL 203 to the meeting location 213.

In some variations, the route analysis component 210 and/or route deviation component 212 can also utilize the contextual information 215 in order to determine a suitable or optimal meetup location 213. For example, the contextual information 215 can indicate whether or not the current location of the autonomous vehicle 101 can be the meetup location 213. Alternatively, the contextual information 215 can determine a distance or direction of travel for the autonomous vehicle 101 in order to arrive at the meetup location. For example, the contextual information 215 can indicate that there is a pedestrian crowd event (e.g., ball game letting out) which affects available parking for 1 square mile.

The route analysis component 210 can communicate the meetup location 213 to the human vehicle selection component 220. The human vehicle selection component 220 can operate to select a human driven vehicle as a guide for the autonomous vehicle 101. The process by which the human vehicle selection component 220 selects a human driven vehicle to guide the autonomous vehicle 101 can vary depending on implementation and design. The human vehicle selection component 220 can query one or more data stores which include information about potential vehicles driven by humans which can also serve as a guide for the autonomous vehicle 101. In particular, human vehicle selection component 220 can query an active trip data store 232, which records human driven vehicles on active transport routes to fulfill transport requests. Accordingly, the active trip data store 232 can include the current location of potential human driven vehicles, as well as the route such vehicles are using (e.g., currently traveling on or planned to travel on). As an addition or alternative, the human vehicle selection component 220 can also access open human driver data store 234, which identifies vehicles driven by humans which are available for new transport request, but which at that current instant are neither on an active trip, nor in process of fulfilling a transport request. As an alternative or variation, the HV selection component 220 can query a transportation library 236, which can identify vehicles for which for which the current location is known or estimated, and for which a current route is known. By way of example, the transportation library 236 can identify municipal buses.

The HV selection component 220 can generate HV criteria 227 for selection against one or more of the active trip data store 232, open human driver data store 234 or transportation library 236. The HV criteria 227 can include data which can be used to select a human driven vehicle to guide the autonomous vehicle 101.

The HV criteria 227 can be based primarily or in part on meetup location 213. Thus, for example, the autonomous vehicle 101 can be instructed to drive to the meetup location 213, which may be selected based on proximity to the current location of the autonomous vehicle 101. The meetup location 213 can then form the basis for identifying a human driven vehicle to guide the autonomous vehicle 101. In variations, the HV criteria 227 include or substitute the current location of the autonomous vehicle 101, and/or other factors such as the route segment which the autonomous vehicle 101 needs to traverse with assistance.

The HV selection component 220 can receive a set of candidate human driven vehicles 231 ("candidate set (of human driven vehicles) 231"), corresponding to human driven vehicles which satisfied the HV criteria 227 (e.g., human driven vehicles which are within a sufficient distance of meeting location 213). The candidate set 231 of human driven vehicles can represent a preliminary result set, from which a final selection is made. Each vehicle of the candidate set 231 can be associated with one or more of a human vehicle current location 233, a human vehicle drop off location 235 or a human driven vehicle route 237.

In one aspect, HV selection component 220 includes a human vehicle route deviation determination component 222 (also "HV RDD component 222"), a time calculation logic 224 and a selection rules 226. For each vehicle identified by candidate set of human driven vehicles 231, the route deviation determination component 222 determines one or more routes to the meetup location 213 from (i) the human vehicle current location 233 (e.g. re-route vehicle while trip with active fare in progress), (ii) the human driven vehicle drop off location 235 (e.g., route human driven vehicle to meeting location 213 upon completion of an active fare), and/or (iii) the human driven vehicle route 237 (e.g., re-route vehicle while trip with active fare in progress). The time calculation logic 224 can calculate an estimated time to arrival ("ETA") for each human driven vehicle of the candidate set 231 based on the determined routes for that vehicle. The time calculation logic 224 can calculate the ETA for each vehicle of the candidate set 231 to (i) arrive at the meetup location 213, where the autonomous vehicle 101 awaits, and/or (ii) arrive at the planned human driven vehicle drop off location 235 for that vehicle, when the vehicle is on an active trip. In the latter case, the time calculation logic 224 can determine how much time is added to the trip of the active trip should that vehicle be chosen to guide the autonomous vehicle 101. In some variations, the time calculation logic 224 can also calculate a time for the chosen vehicle of candidate set of human driven vehicles 231 to guide the autonomous vehicle 101 from the meeting location 213 through the road segment where the event or condition of concern is present.

The selection rules 226 can implement rule-based decision logic for selecting one of the candidate human driven vehicles 231 as the guide vehicle for the autonomous vehicle 101. By way of example, the rules can select the driver from the candidate set of human driven vehicles 231 based on criteria or weights which include: (i) minimization of a time or distance for the selected human driven vehicle to arrive at the meeting location 213, (ii) minimization of additional time needed for the selected human driven vehicle to deviate to the meeting location 213 while on an active trip, then guide the autonomous vehicle 101 and drop off the active fare, (iii) minimization of an absolute time a human driven vehicle requires in order to arrive at meeting location 213 and guide the autonomous vehicle 101 through the road segment of concern, and/or (iv) minimization of a time from when the selected vehicle completes guiding the autonomous vehicle 101 through the road segment and arrives at a next service destination (e.g., pickup location for a transport request selected for the human driven vehicle operating as the guide). The selection rules 226 can also implement other types of selection rules, such as a rule where one human driven vehicle is favored over another based on vehicle type, profile information or historical information about the particular driver (e.g., let the drivers take turns assisting an autonomous vehicle, or select the same driver who has had experience guiding an autonomous vehicle).

As an addition or alternative, the selection rule 226 can select, or weight selection of the human driven vehicle based on a determination of the type of resources which reside with the vehicles of the candidate set 231. In one aspect, a human driven vehicle is weighted for selection as a guide because the vehicle includes integrated sensor equipment for capturing sensor information about the road segment that is of concern to the autonomous vehicle 101. For example, the selected human driven vehicle can include a mechanical extension with a camera set to obtain image data of the road segment, so that a remote service can process and understand the information for other autonomous vehicles.

The HV selection component 220 uses functionality and logic such as described with human vehicle route deviation determination component 222, time calculation logic 224 and selection rules 226 to select a human driven vehicle from the candidate set 231. When HV selection component 220 selects the human vehicle from candidate set 231, an identifier of the chosen human driven vehicle ("HV identifier 255") can be communicated to the autonomous vehicle 101 by the AV interface 204. The HV instruction determination component 230 can also generate a set of instructions 257 for the HV identifier 255. The HV instruction determination component 230 can utilize, for example, map service 199, which is cross-referenced against the human vehicle current location 233, in order to determine a route for the selected vehicle to travel to arrive at the meetup location 213 ("ML route 265"), an approximate or maximum time that the human driven vehicle should wait at the meetup location 213 for the arrival of the autonomous vehicle 101 (should the human driven vehicle arrive at the meeting location first) ("time-to-wait 267" or "TWait 267") and one or more notifications ("notifications 269") which inform the human driver of the selected vehicle of the fact that the autonomous vehicle 101 is/will follow the human driven vehicle. The set of instructions 257 can be communicated to a human driver vehicle system 500 (e.g., see FIG. 5) of the selected vehicle, for purpose of providing information to the human driver, and prompting or otherwise guiding the human driver to perform manual actions consistent with operating the vehicle to guide the autonomous vehicle 101.

In some variations, the HV tracker 244 obtains the location of the guide vehicle ("HV location 245") as the guide vehicle heads towards the autonomous vehicle 101 (or the meetup location 213). The HV tracker 244 can use the HV location 245 (received from a location detection mechanism 560 of the human driver vehicle system 500) to provide updated location information to the autonomous vehicle 101 about the arrival of the selected guide vehicle. As an addition or variation, an estimated time for the guide vehicle to arrive at the meeting location ("HV ML ETA 247") can also be communicated to the autonomous vehicle 101 via the AV interface 204. Still further, in some variations, HV tracker 244 can signal an alert to the autonomous vehicle 101 when the arrival of the guide vehicle to the meeting location 213 is imminent. The autonomous vehicle 101 can also communicate its own location ("AV location 259") directly or indirectly to the guide vehicle.

Once the autonomous vehicle 101 and selected guide vehicle meet, the autonomous vehicle 101 can track the guide vehicle through the road segment which is of concern. In some variations, the human driven vehicle can include sensor-perceptible markers which enable the autonomous vehicle 101 identify the human driven vehicle, then follow or track the selected guide vehicle through the selected roadway. For example, the autonomous vehicle 101 can include cameras which train on a visual marker of the guide vehicle. Still further, the cameras or other sensors can follow the guide vehicle based on markers which are inherent to the vehicle, such as the guide vehicle's license plate, or other inherently perceptible visual characteristics of the vehicle. In some variations, a network service (e.g., "HV guide assistance service 20") tracks the guide vehicle, and further communicate the location of the guide vehicle to the autonomous vehicle 101 for purpose of facilitating and/or enabling the guide vehicle to be tracked through a road segment of concern.

Still further, the human driven vehicle can include location sensors and devices to determine its own location on the roadway, including location information which identifies what lane or side of the road the vehicle is on. The location information can be communicated to the autonomous vehicle 101, which then seeks and follows or tracks the human driven vehicle. The communication of the location information from the human driven vehicle to the autonomous vehicle 101 can be direct or through a remote service. Moreover, in some variations, the human driven vehicle can include components to seek out the autonomous vehicle 101 on arrival to the meeting location 213. In this way, the arrival of the selected human driven vehicle to the meeting location 213 can follow a protocol or handshake in which the two vehicles exchange identifiers and location information before the autonomous vehicle 101 locks on and follows.

In some implementations, the process by which the autonomous vehicle 101 locks on to the human driven vehicle is automatic, and requires the human driven vehicle to simply drive to and/or through the meeting location 213. In variations, the process by which the autonomous vehicle 101 is locked can include manual input or actions. For example, the driver of the human driven vehicle may need to pull over, or drive right next to the autonomous vehicle 101, or operate the human vehicle interface system 500 to send communications or identification signals which facilitate the autonomous vehicle 101 in locking on.

Transport Arrangement System with AV Selection

Figure 3:
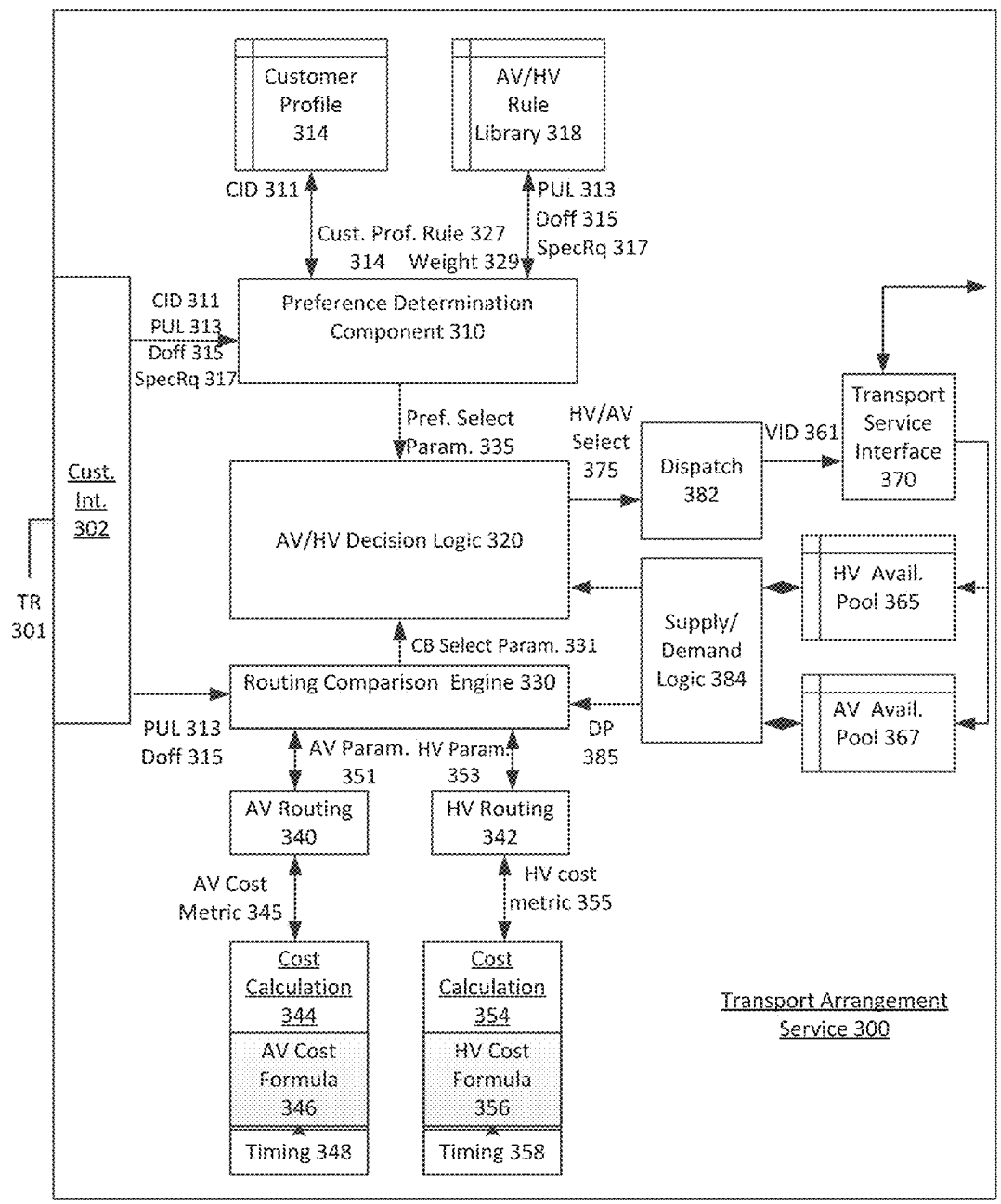
FIG. 3 illustrates an example transport arrangement system which intelligently selects whether to provide a human driven vehicle or an autonomous vehicle to fulfill a transport request.

FIG. 3 illustrates an example transport arrangement system 300 which intelligently selects whether to provide a human driven vehicle or an autonomous vehicle to fulfill a transport request. A human vehicle guide assistance system 200 can implement a corresponding service, such as described with transport arrangement service 10 of FIG. 1. In FIG. 3, the transport arrangement system 300 includes a preference determination component 310, an AV/HV decision logic 320, a routing comparison engine 330, and predictive routing components for autonomous vehicles ("AV routing 340") and for human driven vehicles ("HV routing 342"). The system 300 can also include the customer interface 302, which can operate as an interface for customers to request transport services.

Among other benefits and technical affects, an embodiment of FIG. 3 recognizes that autonomous vehicles will not always be able to reach a desired location or take a most efficient route, because of limitations in the ability of such vehicles to understand the environment and setting. For example, if the pickup location is in a gated community, system 300 can recognize that the human driver can negotiate the needed steps to arrive at the customer door, while the autonomous vehicle will likely need to meet the customer at the gate. Likewise, as described with other examples (see FIG. 2), urban settings are dynamic in terms of obstacles and conditions which affect the autonomous vehicle's ability to understand and navigate, and such events can be temporal to the hour or day. System 300 recognizes that, when implemented with, for example, on-demand transportation services, the autonomous vehicle may require deviations to service locations and/or routes. Additionally, as described with an example of FIG. 2, system 300 recognizes that an autonomous vehicle may require additional resources to complete a trip as a result of events or conditions of the roadway. Still further, an example of FIG. 3 recognizes that such limitations of autonomous vehicles can affect which type of vehicle is more suited for a particular transport request, such as what type of vehicle the user or customer would ultimately prefer.

The customers can, for example, operate an application on customer mobile computing devices. When launched, the applications can automatically link the mobile computing device of the customer with the transport arrangement system 300. In linking the customer, the application can generate transport requests 301 ("TR 301") in response to user input. The transport requests 301 can communicate the following information: (i) an identifier of the customer and/or customer account ("customer identifier 311"), and (ii) one or more service locations for the transport request 301, such as a pickup location 313 and/or a drop off location 315. Additionally, the transport request 301 can include an interface in which the customer can specify additional requests or parameters ("special request 317"). The special request 317 can vary depending on implementation and design, such as, for example, input or other indication (e.g., inference of customer location) that the user has groceries or a large number of items to carry. Additionally, the special request 317 can optionally specify a preference of the user for a vehicle type, and specifically for whether the user prefers an autonomous vehicle or a human driven vehicle.

With further reference to FIG. 3, the customer interface 302 can communicate the customer transport request 301 to the preference determination component 310. The preference determination component 310 can use the customer identifier 311 to obtain a customer profile 314. Additionally, in some variations, the customer profile 314 can include data which indicates one or more of the following information: (i) a setting or pre-stored preference of the user to receive an autonomous vehicle or a human driven vehicle; (ii) recent types of vehicles which provided transport services for the vehicle, such as the number of times the user received or specifically requested an autonomous vehicle; (iii) rating information the customer provided for past transport, including rating or feedback the customer provided for an autonomous vehicle; (iv) data indicating a user preference for transport factors which can be affected if an autonomous vehicle is used to provide the transport, including data indicating whether the customer can tolerate (a) paying a premium for one type of vehicle (e.g., should demand for one vehicle exceed demand for another, or if one type of vehicle is more expensive than the other), and/or (b) a service location that is deviated from the intended drop off location (e.g., such as when the autonomous vehicle cannot safely drive to the drop off location).

In some variations, the preference determination component 310 can also access a library of currently known locations which are likely to be problematic for the autonomous vehicle 101 ("rule library 318"). The rule library 318 can provide a selection rule 327 and/or weight 329, to govern or influence the selection of one type of vehicle over another. The selection rule and/or weight 329 can based on location parameters (e.g., pickup location 313 and drop off location 315), special requests 317 of the transport request, and/or timing parameters (e.g., time of day). The rule library 318 can thus provide selection rules which can correlate to parameters included with the transport request 301. For example, one or more of the service locations may be inaccessible or difficult to reach for the autonomous vehicle. Alternatively, any special request 317 of the customer can rule out, or favor against, one type of vehicle. For example, if the customer has groceries, the autonomous vehicle may be ruled out for lack of interior space.

The preference determination component 310 can signal a selection parameter 335 to the AV/HV decision logic 320. The preference selection parameter 335 can account for the customer preference, as well as the parameters of the transport request 301. The selection parameter 335 can also factor in by weight or other determination the selection rule 327 and weight 329.

According to some examples, the customer interface 302 can also communicate the service locations (e.g., the pickup locations 313 and/or drop off locations 315) to the routing comparison engine 330. The routing comparison engine 330 can operate to predict the route for the transport request 301, taking into account optimization parameters and predictions of whether the autonomous vehicle 101 will deviate from an optimal route, or require variation to pickup or drop off locations 313, 315. As described with an example of FIG. 1 or FIG. 2, embodiments recognize that autonomous vehicles by their nature require assistance in urban settings due to the inherent limit of such vehicles to understand sensor input to a threshold level which is deemed safe.

In more detail, the routing comparison engine 330 can implement an AV routing process 340 which processes optimal and feasible routes between the pickup location 313 and the drop off location 315. The predictive route determination as implemented by the AV routing process 340 can utilize, for example, real-time traffic information and region-specific information, such as provided with the map service 199 (see FIG. 2) or the region-specific information source 217 (see FIG. 2). The AV routing process 340 can determine whether the autonomous vehicle will (i) likely need deviation of either the pickup location 313 or the drop off location 315, or (ii) assistance of a human driven guide vehicle (as described with an example of FIG. 2). In the latter case, the AV routing process 340 can identify a likely wait time or delay for the autonomous vehicle. The AV routing process 340 can use cost calculation 344 to estimate an AV cost metric 345 for the use of an autonomous vehicle to fulfill the transport request 301. The cost calculation 344 can include a cost formula 346 (e.g., the fare value for a customer to receive transport), and timing cost component 348 to determine time parameters for the particular selection.

In determining the AV cost metric 345, some variations provide that the cost calculation 344 can incorporate probabilistic determinations as to whether the autonomous vehicle will need to deviate or wait (for a human driven vehicle guide, etc.). Accordingly, the cost metric 345 can measure timing cost, meaning additional time which will be needed from the customer (or from the transport service) in order to fulfill the transport request 301 using an autonomous vehicle. The cost metric 345 can also include the price or service charge for the autonomous vehicle, with possible additions as a result of extra distance travelled (e.g., due to route or drop deviation) or wait time (e.g., for human driven guide vehicle). In variations, the cost metric 345 can measure other costs for the customer, the transport service provider or even drivers. These other costs can include, for example, demand of fuel, or demand reduction in inventory for specific type of vehicle. For example, if the transport request 301 specifies service locations in areas which are known to be problematic for the autonomous vehicle, the AV routing process 340 can factor an opportunity cost for the service, in that the autonomous vehicle may be better suited for other transport requests which are likely to be received in a duration when the transport request 301 is received.

The AV routing process 340 can include an alternative instance of HV routing process 342, which determines the route and cost ("HV cost metric 355") for use of human driven vehicles. The HV cost metric 355 can be primarily monetary when the assumption is made that the rate for autonomous vehicle is the same or greater than human driven vehicles. A cost calculation 354 for determining the HV cost metric 355 can also be computed from a corresponding HV cost formula 356 and timing logic 358 (e.g., to determine ETA).

The AV and HV routing components 340, 342 can provide cost metric parameters 351, 353 to the routing comparison engine 330. The cost metric parameters 351, 353 can correspond to, for example, parameter sets and/or normalized values which enable comparison of various dimensions of cost, including monetary cost to the customer, cost basis for the transport provider, and/or lost opportunity cost for the customer and provider. The routing comparison engine 330 can compare the cost metric parameters 351, 353 determined from the respective AV and HV routing component 340, 342 in order to determine a cost-based selection parameter 331. The cost-based selection parameter 331 can reflect, for example, a comparison of the monetary cost to the customer, as well as other cost parameters, including cost for the transport service or hidden costs such as lost time or added transport resources (e.g., such as providing a human driven guide vehicle).

In determining the cost-based selection parameter 331, some variations provide for the routing comparison engine 330 to compare the available pool of human driven vehicles 365 with the pool of autonomous vehicles 367. For example, the transport arrangement system 300 can maintain a service interface 370 which tracks the pool of active vehicles, and then updates respective data stores to reflect current demand and supply for human driven vehicles (HV pool 365") and autonomous vehicles (AV pool 367"). For example, the price per unit for each type of vehicle can increase based on demand versus supply at a given moment. Still further, the demand and supply of the respective pools 365, 367 of human vehicles and autonomous vehicles can factor in as a system cost if one pool is relatively over-/under-used relative to the other pool. In an example of FIG. 3, a supply/demand logic 384 can generate demand parameters 385 ("DP 385") reflecting demand or availability of each of the respective pools 365, 367. The route comparison engine 330 can use the demand parameter 385 in comparing the relative cost of each vehicle type. Thus, the cost-based selection parameter 331 can include a variable or value to reflect the demand parameter 385.

The routing comparison engine 330 can signal the cost-based selection parameter 331 to the AV/HV decision logic 320. The AV/HV decision logic 320 can generate a vehicle type selection 375 based on the preference selection parameter 335 and/or the cost-based selection parameter 331. The preference selection parameter 335 and cost-based selection parameter 331 can be combined by rule, weight, or other factor to reflect (i) absolute determinations in which one type of vehicle is ruled out (e.g., expressed user request for human-driven vehicle, autonomous vehicle rules out), and/or (ii) weighted or calculated determinations based on application of the preference based selection parameter 335 and/or the cost-based selection parameter 331.

Examples further provide that the AV/HV decision logic 320 can make suggestions or recommendations based on the vehicle type selection 375 of AV/HV decision logic 320. For example, if the user expressed (e.g., specified in the transport request 301, or by user setting) or inferred preference (e.g., based on past transports) strongly weights the determination to human driven vehicle, the AV/HV decision logic 320 can perform parallel calculations to generate the recommendation for the autonomous vehicle on the premise that, for example, the autonomous vehicle has greater supply and/or is cheaper at the moment.

In one implementation, the vehicle type selection 375 can be communicated to a dispatch component 382, which can then select the vehicle (as shown by the vehicle identifier 361) based on the vehicle type. The vehicle type selection 375 can also be communicated to the customer interface 302 to communicate the selection back to the customer. In one variation, the customer can alter or overrule the selection.

Remote Human Assisted Response System

FIG. 4 illustrates an example system for using human operators to instruct autonomous vehicles on handling and/or understanding of events or conditions of a roadway. As described with some examples, the human operators can remotely assist the autonomous vehicle 101 when, for example, a confidence in the safety of the autonomous vehicle is negatively affected.

As another alternative, the human operators can remotely assist the autonomous vehicle 101 when, for example, the autonomous vehicle lacks understanding of the event or condition, and requests information for future handling or training. For example, the AVS 100 can implement one or more training models to understand roadway objects or other conditions or events. As part of implementing the training, the AVS 100 can make determinations as to the nature, characteristic or other attribute of an object using, for example, one or more learned models. When such determinations are made, the AVS 100 can check the answer with a remote human operator and use the answer to update the training model.

In an example of FIG. 4, a human assisted response system for autonomous vehicles ("HARSAV 400") can implement a remote human operator assistance service 30 (see FIG. 1) in communication with AVS 100. In an example of FIG. 4, the AVS 100 can include sensor output logic or functionality 410 for rapid selection and communication of select sensor data 411 to the remote human operator assistance system 400 via the service interface 140. The select sensor data set 411 can be determined separately from sensor data 111 communicated to the controller 144 for controlling the vehicle.

According to one aspect, the sensor interface 105 obtains the raw sensor data 99 from the various sensor components, and the sensor analysis component 110 implements functionality such as object detection, image recognition, image processing and other sensor processes in order to detect hazards or unknown objects or events in the roadway. In this regard, the sensor analysis component 110 can be implemented by multiple different processes, each of which analyze different sensor profile data sets 95. In an example of FIG. 4, the sensor analysis component 110 includes response library 445 for determining appropriate responses to known objects. When the sensor analysis component 110 has sufficient confidence of the nature of the object and can select or identify the appropriate response from the response library 445, the sensor analysis component 110 can communicate a response action 447 ("RAction 447") to the controller 144. The controller 144 can then implement vehicle control signals 149 to control the vehicle interface subsystem 130, including selecting interfaces such as brake interface 136 and/or steering interface 134. The vehicle control signals 149 can implement the response action 447 by default, independent of any remote assistance or human intervention.

An example of FIG. 4 recognizes, however, that autonomous vehicles tend to be cautious and deliberate. When autonomous vehicle 101 is used to carry passengers, for example, the AVS 100 may implement the sensor analysis component 110 to repeatedly analyze perceived objects and conditions. By the nature of the autonomous vehicle 101, the autonomous vehicle 101 will slow down or brake to evaluate unknown objects or conditions, or to select a response action when the best response action is not known with sufficient confidence. The result is that the autonomous vehicle 101 may tend to slow and stop and start on a trip, making the ride less enjoyable and uncomfortable. Examples further recognize, however, that if the sensor analysis component 110 can recognize objects or conditions in faster time, or select the response action more quickly, the autonomous vehicle 101 will have less variation in braking events (e.g., to reduce speed or come to stop). The reduction in braking events can make autonomous vehicle 101 more suitable for carrying passengers, as reduction in braking events makes the passenger ride in the autonomous vehicle 101 more comfortable.

Accordingly, AVS 100 can be configured to optimize transfer of select sensor data 411 from the autonomous vehicle 101 to the HARSAV 400, and also to communicate the sensor data 411 in a format or structure which lends itself to rapid rendering for human perception, so that a human operator can provide a rapid and appropriate input which specifies the response action of the AVS 100. The autonomous vehicle 101 can implement or configure the sensor analysis component 110 to generate one or more types of alerts 413 when the analysis of the sensor profile sets 95 identify (i) an unknown or unexpected object or condition in the path of the vehicle (e.g., long range camera detects a bag in road, but the image processing does not recognize the bag or distinguish the bag from rock or solid object), and/or (ii) a relatively known object or condition which may require a response for which the outcome is sufficiently uncertain (e.g., emergency vehicle in road, response to pull over on shoulder uncertain given environmental or event conditions). The alerts 413 can specify or trigger a request for assistance. In variations, the alerts 413 can specify different types of assistance requested, such as, for example, assistance to identify an object or condition, assistance to identify a response to an event or condition, and/or an alert to identify an object or condition and the appropriate response for handling the object or condition. Still further, in other variations, the alerts 413 can specify urgency levels, and further assign time limits for the human assistance response. For example, an urgent alert may seek a response in less than two seconds, after which the autonomous vehicle 101 will perform the default response action of initiating hard braking. A medium alert may provide for a response time of less than 3 seconds, after which the autonomous vehicle 101 will perform the default response action of initiating moderate braking while continuing to monitor for the human assist response. The difference in the urgency levels may be based on, for example, the proximity of the objet or condition when it is detected, the speed of the vehicle, the dimensions of the object or other perceived physical characteristics of the object of concern.

In one variation, the alerts 413 are communicated to the remote human operator assistance system 400 via the service interface 140. The sensor analysis component 110 can include sensor output logic 410 to identify relevant sensor data, filter or sort the relevant sensory data so that the most relevant sensor information is communicated at the start. An output sensor set 411 can be generated to reflect sorted and prioritized sensor information for an event or condition. The sensor data items of the sensor profile set 95 which are selected as the output sensor data set 411, can be based on, for example, the sensory view or perception that provides the most information about the unknown object or condition. The output sensor set 411 can serve as or be a portion of the alert 413.

In an example of FIG. 4, the HARSAV 400 includes an autonomous vehicle interface ("AV interface 432") and a human operator interface component 434. The AV interface 432 processes alerts 413 from one or multiple autonomous vehicle 101. In one implementation, each alert 413 can be assigned to a human operator. Thus, the alert 413 can be parsed by the AV interface 432 for an identifier 421 of the autonomous vehicle 101, and then forwarded to the human operator interface component 434 of a corresponding human operator. The response 435 from the human operator can be communicated back to the autonomous vehicle of the identifier 421. Each alert 413 can also include a payload or select sensor data 411, which identifies the object, condition or event for which input is needed. The human operator interface component 434 can be structured to immediately render the sensor data 411 in a manner that organizes the data to facilitate human perception and response time. For example, the human operator interface component 434 can organize the sensor data 411 to reflect or preserve orientation and directionality of the autonomous vehicle 101 as the sensor data was captured. The human operator interface component 434 can also implement processes to progressively reveal or render the sensor data 411, with smaller data items being rendered first.

The human operator interface component 434 can also include one or more interfaces for the human operator which facilitate the human operator perception. For example, the human operator interface component 434 can include a simulation view from within the autonomous vehicle 101, or from just outside of the vehicle. In some variations, the human operator component 434 can provide a three-dimensional or third-person view of the roadway and/or autonomous vehicle. As an addition or alternative, the human operator component 434 can generate and display one or more map interfaces to display relevant maps (e.g., maps showing surrounding environment of roadway being driven by the autonomous vehicle) for the roadway of the autonomous vehicle 101. Still further, the human operator interface component 434 can include functionality for enabling human operator to request more information. The human operator interface component 434 can enable the operator to make the request without specificity or particular though, but rather through visual intuition. For example, rather than have the operator request additional sensor data from a specific sensor, the operator can simply point to a region of a visual representation of the vehicle, and the operator's request can be automatically converted into a request for raw or processed sensor data from a specific set of sensors of the region identified by the operator. For example, the operator may request to view above the vehicle, or view the long range camera image, and the request can be signaled by the operator contacting a display screen coinciding to regions above the vehicle or out in front of the vehicle.

According to some examples, a pre-response menu logic 450 can be provided with functionality of the HARSAV 400 or the AVS 100 in order to reduce the response time of the human operator. In one implementation, the pre-response menu logic 450 can be implemented as part of the human operator interface component 434 to render a set of options for the human operator. As an addition or variation, the pre-response menu logic 450 can execute in part or whole with the AVS 100, so that an appropriate menu of response options 455 is selected based on the context and known information about the unknown object, condition or event. For example, if an unrecognized object is far out in front of the autonomous vehicle 101, the pre-response menu logic 450 can execute to provide a first preset menu or first set of options from which the human operator can make a selection. If an unknown object is off to the side or behind the autonomous vehicle 101, the pre-response menu logic 450 can operate to provide a second preset menu or second set of options. In this way, a variation provides that context and other information which is known about the unknown object, event or condition can be used to select the options from which the human operator can make selection. The selection of the human operator can correspond to the response action that the autonomous vehicle 101 is instructed to implement. For example, the menu of response options 455 can specify a set of actions which specify a specific steering and/or pace control action. An example of menu of response options 455, which can be generated from the pre-response menu logic 450 and rendered on the human operator interface component 434, is shown with an example of FIG. 15.

Human Vehicle Interface System

Figure 5:
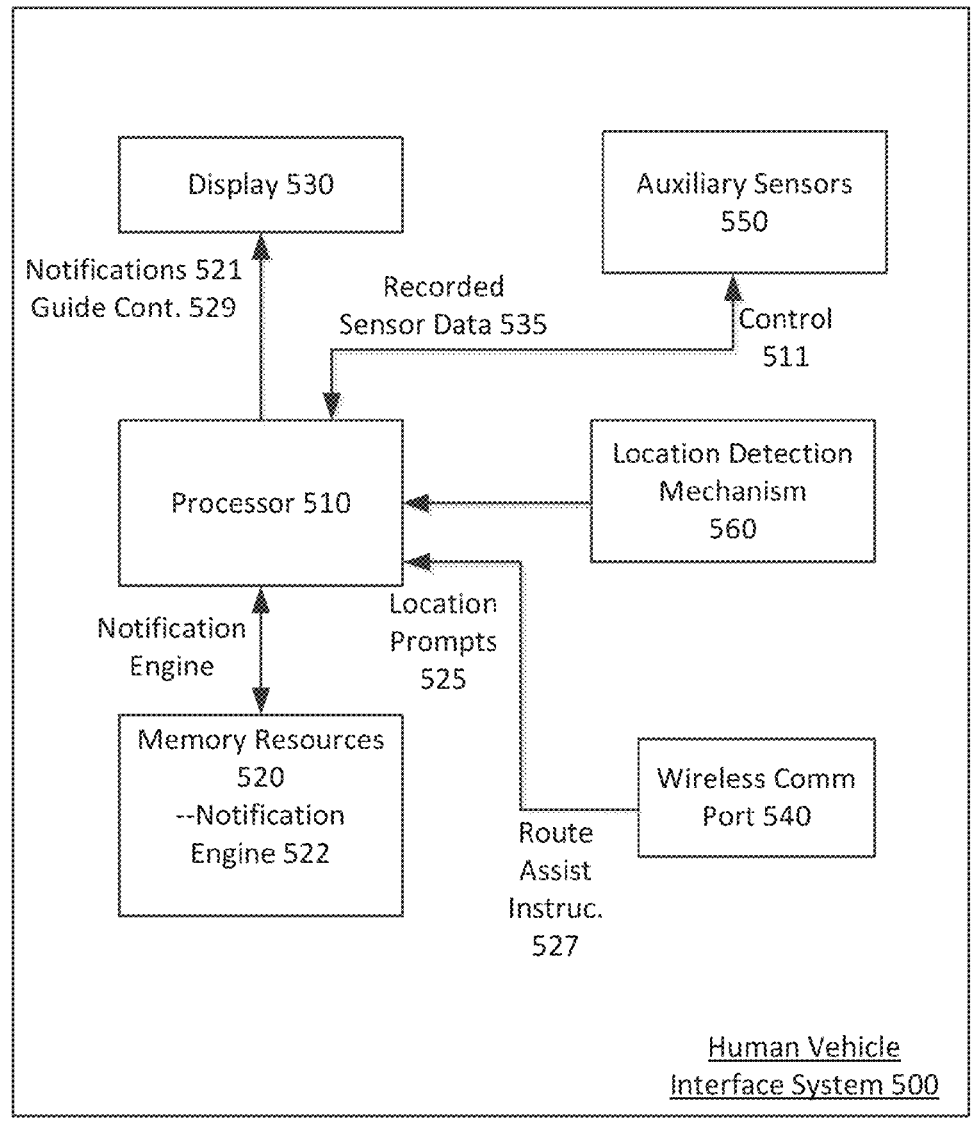
FIG. 5 illustrates a human vehicle interface system for use with examples as described herein.

FIG. 5 illustrates a human vehicle interface system for use with examples as described herein. According to some implementations, a human vehicle interface system 500 can be implemented using a mobile computing device of a driver. For example, a cellular telephony device of a driver can include an application for providing functionality for implementing the human vehicle interface system 500. In variations, a driver vehicle can integrate some or all of the components and functionality described for providing the human vehicle interface system 500. Still further, some vehicles can include auxiliary components which operate independently of other aspects of the human vehicle interface system 500.

In an example of FIG. 5, the human vehicle interface system 500 includes a processor 510, memory resources 520, a display device 530 (e.g., such as a touch-sensitive display device), one or more wireless communication ports 540 (including wireless communication sub-systems), and one or more location detection mechanisms 560. The human vehicle interface system 500 can also include a set of auxiliary sensors 550 for sensing an environment of the vehicle as, for example, when the vehicle acts as a guide for autonomous vehicle 101. In variations, the set of auxiliary sensors 550 can include, for example, a suite of sensor devices such as shown and described with an autonomous vehicle 101 of FIG. 1. The sensors can, for example, extend out of the vehicle and capture 2D or 3D images of a scene, capture images above or below the vehicle, and obtain sonar or Lidar images of the surrounding area.

A variety of geo-aware resources and position detection mechanisms can be used for the location detection mechanisms 560. By way of example, the location detection mechanism provided with the human vehicle interface system 500 can include Global Position System (GPS) resources, visual odometry, landmark recognition (e.g., image processing from camera sensors), and/or motion sensor processing. In some examples, the location detection mechanisms can provide redundant or alternative location detection abilities for GPS, when, for example, the human vehicle interface system 500 has poor or non-existent GPS reception. The wireless communication port 540 may send and receive wireless data over one or more wireless data channels (e.g., cellular channels). In an example of FIG. 5, the memory resources 520 can store instructions for a notification engine 522. The processor 510 can execute the instructions of the notification engine 522 in order to display or render notifications 521 on the display device 530. The notifications 521 can, for example, be generated or otherwise based on data communicated from the HV guide system 200 of FIG. 2. The display device 530 can display, for example, messages that inform the driver of the role the driver is to play in guiding an autonomous vehicle 101. An example of notifications 521 for display to the driver in the role of guide vehicle are shown by an example of FIG. 11A through FIG. 11C.

When the human vehicle interface system 500 operates in a vehicle that serves as a guide, the processor 510 can also receive guide instructions (or route assistance instructions) 527 over the wireless communication port 540. The guide instructions 527 can, for example, be rendered as guide content 529 which provides visual information and/or textual information to assist the driver in locating the autonomous vehicle 101, and further for driving in a manner which facilitates the autonomous vehicle to track or follow.

The notification engine 522 can also execute to communicate with the driver and trigger the driver to switch on, or otherwise operate the set of auxiliary sensors 550. For example, the notification engine 522 can use location prompts 525 received from the HV guide assistance system 200 (see FIG. 2) over the wireless communication port 540, to notify when the driver should initiate recording sensor information 535 using, for example, the set of auxiliary sensors 550. Thus, for example, a HV guide vehicle can serve a dual role of recording sensor information 535 for a particular road segment that is difficult for one autonomous vehicle 101 to navigate. With additional information as determined from the sensor information 535, the HV guide system 200 can determine information to facilitate other vehicles in avoiding or driving through the road segment of concern. By way of example, the sensor information 209 can be processed and implemented as information which comprises a portion of the region specific information source 217 (see FIG. 2).

In some variations, the set of auxiliary sensors 550 can operate independently and/or separately from the other components of the human vehicle interface system 500. For example, in one implementation, the processor 510 can implement control 511 over one or more auxiliary sensors by, for example, signaling when the sensor devices should operate. Additionally, the processor 510 may receive the recorded sensor information 535 and store the data and/or communicate the data to a remote service which can process or otherwise utilize the data. In variations, however, the auxiliary sensor set 550 can operate independently of the processor 510, which can be on a mobile computing device of the driver. Thus, the auxiliary sensor set 550 can optionally include separate wireless communication, memory and processing resources, and further work under control of a remote service.

In some variations, the human vehicle interface system 500 can be implemented as a mobile computing device that also receives instructions or prompts from a remote service to trigger the driver in obtaining information about a roadway. For example, the processor 510 can receive an information prompt from over the wireless communication port 540, which can be rendered on the display device 530 or through audio to cause the driver to provide information, or take another action (e.g., pull over and use camera on the mobile computing device to take a picture of the roadway segment).

Remote Service or System Computer System

Figure 6:
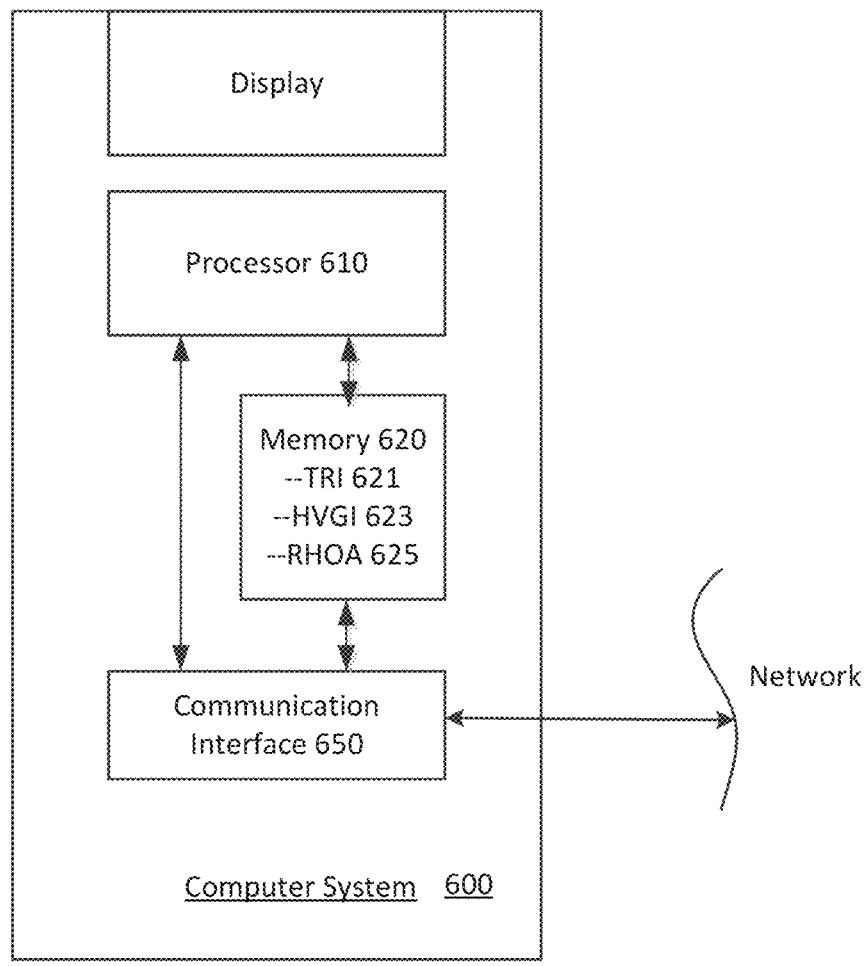
FIG. 6 illustrates an example computer system on which one or more examples can be implemented.

FIG. 6 is a block diagram that illustrates a computer system upon which embodiments described herein may be implemented. A computer system 600 can be implemented on, for example, a server or combination of servers. For example, the computer system 600 may be implemented as part of a network service, such as transportation arrangement service 10 (see FIG. 1) or system 300 (see FIG. 3), HV guide assistance service 20 (see FIG. 1) or system 200 (see FIG. 2), and/or remote human operator assistance service 30 (see FIG. 1) or system (see FIG. 4). In the context of FIGS. 1 through 4, the services and corresponding systems for arranging transport, providing human vehicle guide service, and/or remote human operator assistance service can be implemented using a computer system or computer system combination such as described by FIG. 6. As an alternative to a server or server combination, any of the example services or systems described can be implemented using a combination of multiple computer systems as described by FIG. 6.

In one implementation, the computer system 600 includes processing resources 610, memory resources 620 (including a read-only memory (ROM) and/or a storage device), and a communication interface 650. The computer system 600 includes at least one processor 610 for processing information stored in memory resources 620. The memory resources 620 include a main memory component, random access memory (RAM) and/or other dynamic storage device, for storing information and instructions which are executable by the processor 610. The memory resources 620 also may be used for storing temporary variables or other intermediate information during execution of instructions to be executed by the processor 610. The memory resources 620 can use ROM or other static storage device for storing static information and instructions for the processor 610. A storage device, such as a magnetic disk or optical disk, is provided for storing information and instructions.

The communication interface 650 enables the computer system 600 to communicate with one or more networks 680 (e.g., cellular network) through use of the network link (wireless or a wire). Using the network link, the computer system 600 can communicate with one or more computing devices, such as with autonomous vehicles 101 and/or devices which are used with or as human vehicle interface system 500 (see FIG. 5). In accordance with examples, the computer system 600 receives location information for human driven vehicles and autonomous vehicles which combine by one or more of the services as described to provide the hybridization of enhanced or augmented services. The executable instructions stored in the memory 630 can include (i) instructions 621 for implementing the transport arrangement service 10 (see FIG. 1) and system thereof (see FIG. 3) ("TRI 621"), (ii) instructions 623 for implementing the HV guide assistance service 20 (see FIG. 1) and system thereof (see FIG. 2) ("HVGI 623"), and (iii) instructions 625 for implementing remote human operator assistance service 30 (see FIG. 1) and system thereof (see FIG. 4) ("RHOA 625"). For example, execution of the instructions 625 can cause a user interface to be presented, on the display associated with the computer system 600, to enable a human operator to provide guidance responses, via an input mechanism, to be transmitted to an autonomous vehicle, such as described with respect to FIG. 4.

Examples described herein are related to the use of the computer system 600 for implementing the techniques described herein. According to some examples, those techniques are performed by the computer system 600 in response to the processor 610 executing one or more sequences of one or more instructions contained in a main memory of the memory resources 620. Such instructions may be read into the main memory from another machine-readable medium, such as a storage device. Execution of the sequences of instructions contained in the memory resource 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Methodology and Examples for Human Guide Vehicle Assistance

Figure 7:
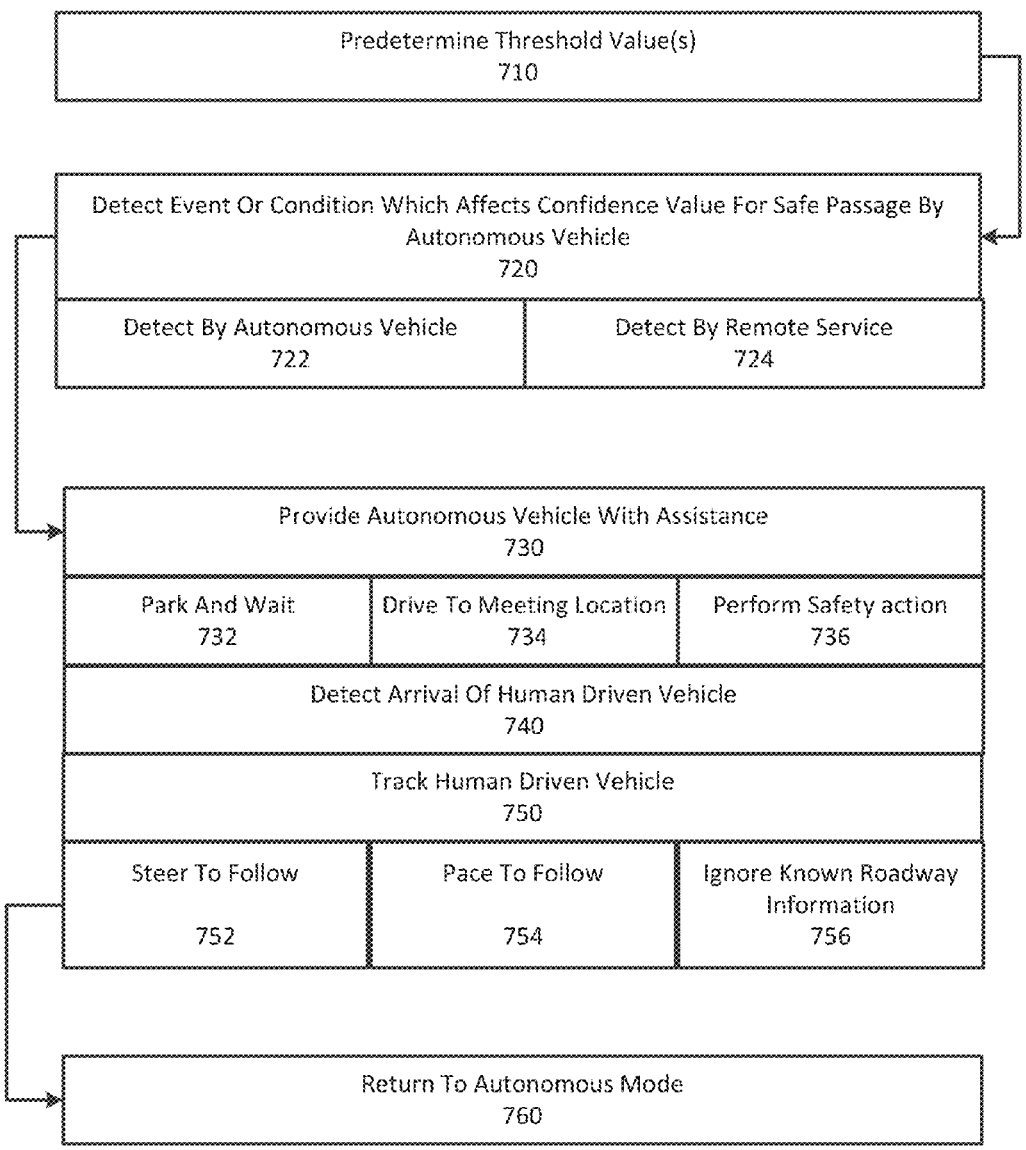
FIG. 7 illustrates an example method which can be performed by an autonomous vehicle in order to receive human driven guidance.
Figure 8:
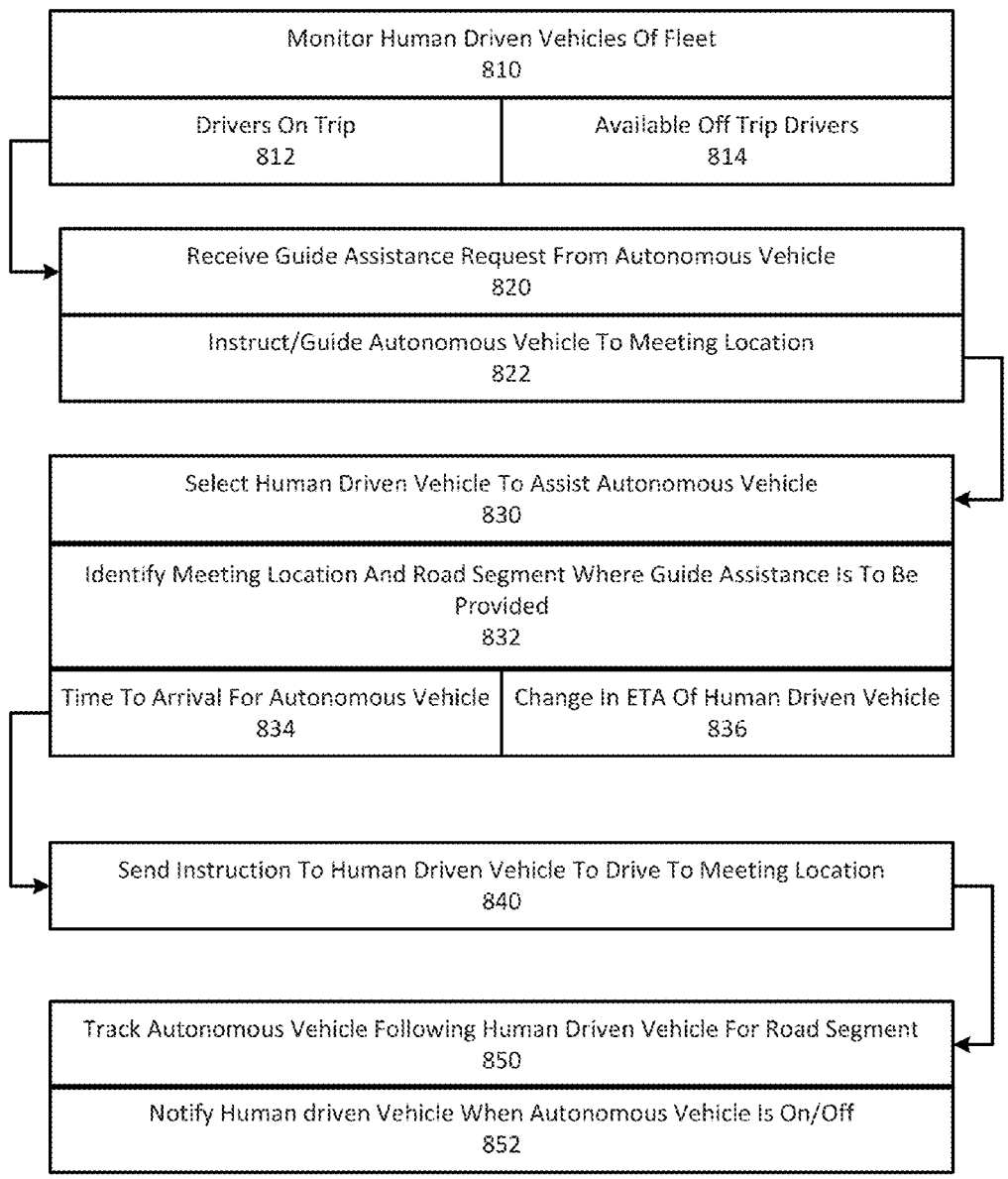
FIG. 8 illustrates an example method which can be implemented by a service in order to pair an autonomous vehicle with a human driven vehicle to receive driven guidance.
Figure 9:
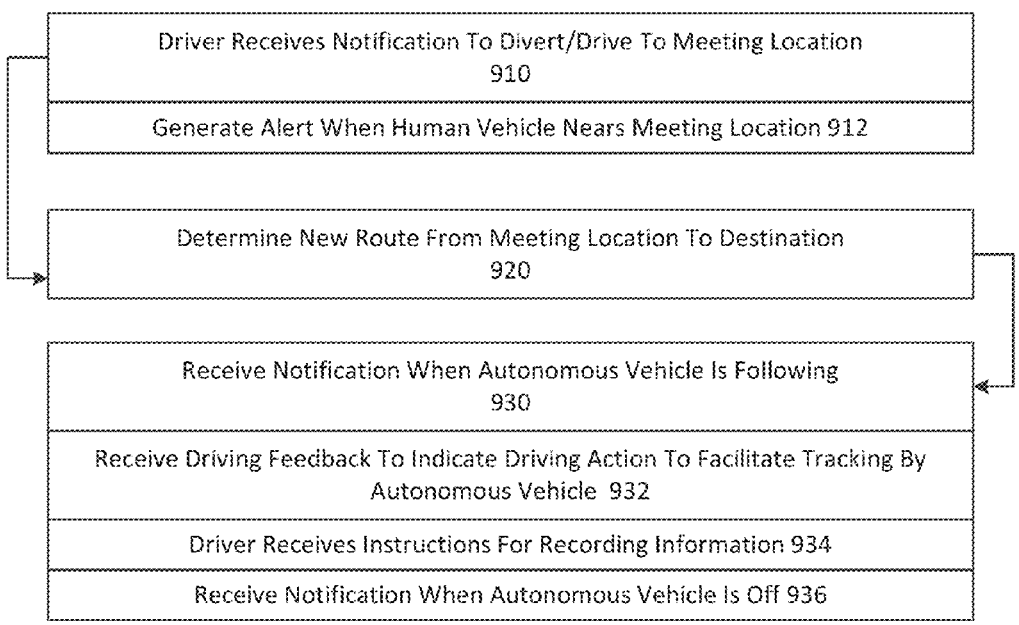
FIG. 9 illustrates an example method for instructing a human operator to drive a vehicle for a purpose of assisting an autonomous vehicle.

FIG. 7 illustrates an example method which can be performed by an autonomous vehicle in order to receive human driven guidance. FIG. 8 illustrates an example method which can be implemented by a service in order to pair an autonomous vehicle with a human driven vehicle to receive driven guidance. FIG. 9 illustrates an example method for instructing a human operator to drive a vehicle for a purpose of assisting an autonomous vehicle. Example methods such as described with FIGS. 7 through 9 can be implemented using, for example, systems and services such as described with examples of FIG. 1 and FIG. 2. Additionally, hardware components and functionality for implementing aspects of a human driven vehicle interface system, in connection with use of a human driven vehicle as a guide, may can utilize hardware components and functionality such as described with an example of FIG. 5. Furthermore, hardware components and functionality for implementing aspects of a network service can be implemented using a computer system such as described with an example of FIG. 6. In describing examples of FIGS. 7 through 9, reference may be made to elements of FIGS. 1, 2, 5 and 6 for purpose of illustrating suitable components and functionality for implementing or performing operations as described.

With reference to FIG. 7, the autonomous vehicle 101 can provide transport services in the form of driving passengers, or delivering packages or items. The AVS 100 of the autonomous vehicle 101 can operate to continuously detect events or conditions which affect the confidence value of the AVS 100 for safe passage. More specifically, the confidence value which is determined by the AVS 100 can reflect a variety of parameters, depending on design and implementation. In some examples, the confidence value reflects (i) a level of certainty in how the AVS 100 proceeds and understands the roadway, (ii) the events or conditions affecting the roadway, and/or (iii) the actions which the AVS 100 needs to perform in order to safely progress along its route to the destination. In this regard, events or conditions which the AVS 100 has previously encountered may have inherently higher confidence values, while relatively new or never before encountered scenarios can result in low confidence values. In urban settings, for example, traffic, road construction, pedestrian events and numerous other situations can often be perceived as a relatively new condition or event, in that the nature of such events or conditions are relatively unique at different instances of time, as well as in different geographic locations of the region.

The AVS 100 of the autonomous vehicle 101 can predetermine threshold level (or levels) for when the confidence values are to be deemed unsafe (710). Furthermore, the AVS 100 can tune the threshold values to reflect a changing environment or set of conditions. Different geographic regions may require different thresholds for confidence values which are deemed safe or unsafe. For example, a geographic region which has relatively less traffic and fewer road hazards, as well as slower moving vehicles can have a confidence value that is more forgiving with regards to uncertainty in the sensory perceptions of the AVS 100. According to one example, an operator of the transport arrangement system can provide predetermined threshold levels to the AVS 100.

An event or condition which affects the confidence value for the AVS to determine action, based on the predetermined threshold values (720). According to some examples, the AVS 100 can correspond to the entity that detects the event or condition (722). In some variations, a remote service (e.g., remote human operator service 30 of FIG. 1) can detect or anticipate the event or condition (724).

When the event or condition is detected, the autonomous vehicle 101 is provided with assistance (730). When, for example, the AVS 100 detects an event or condition for which the confidence value is below the threshold for safe passage, the AVS 100 can generate an event request 121 (see FIG. 1). In some variations, the service requested by or provided to the autonomous vehicle 101 can be based on the type of event or condition that is detected. For example, with reference to an example of FIG. 1, multiple services for assisting autonomous vehicles can be available to the AVS 100. The AVS 100 of the autonomous vehicle 101 can make a determination of which service to access or request assistance from using, for example, computer-based intelligence or logic. In making the request, the AVS 100 can signal the event request 121 across, for example, one or more wireless networks for handling by the selected network service. In an example of FIG. 7, the event request 121 can be fielded by HV guide assistance system 200, as described by an example of FIG. 2. The autonomous vehicle 101 can receive assisted guidance from a human driven vehicle in order to facilitate the autonomous vehicle's passage through the road segment that is of concern to the AVS 100.

In some examples, the receipt of the human driven vehicle guidance can be implemented by the AVS 100 in separate phases, and each phase may require different types of actions from autonomous vehicle 101. First, the AVS 100 can be instructed by the route analysis component 210 to traverse to a meetup location 213 where the autonomous vehicle 101 can await the arrival of the selected human driven guidance vehicle (732). In one basic example, the instructions for the autonomous vehicle can simply communicate that the autonomous vehicle 101 is to park or pull over at the first available open space on the current road segment. However, examples recognize that events or conditions which generate uncertainty in the vehicle often preclude a vehicle from being able to pull over and park. For example, extreme road congestion and/or pedestrian events can preclude the autonomous vehicle 101 from finding or accessing a parking space or a shoulder on which the vehicle can park and wait.

Thus, in variations, the AVS 100 can be instructed by way of a route to drive to a meeting location (734). The instructions can also specify that the autonomous vehicle 101 should wait at the meeting location, as well as perform other safety actions such as turning on headlights and/or emergency lights (736). The determination of what actions the vehicle should perform, such as switching on lights, can be based in part on environmental factors, such as the time of day, the weather conditions, the amount of traffic or congestion where the meeting location is, and various other conditions. The AVS 100 can implement the instructions using the vehicle interface subsystem 130. For example, the HV guidance system 200 can communicate route information 141 to the AVS 100 so that the controller 144 can implement route control 147 and cause the vehicle interface subsystem 130 to steer the vehicle to the meetup location 213. At the meetup location 213, the HV guidance system 200 can communicate instructions 151, and the controller 144 can implement vehicle control signals 149 in order to cause the vehicle to wait at the meetup location 213, and perform other actions such as switching on lights.

According to some variations, the autonomous vehicle 101 arrives at the meeting location 213 before the human driven guide vehicle. For example, the meetup location 213 can be assumed to be in close proximity to the location of the autonomous vehicle 101 when the event request 121 is first signaled. Once at the meeting location 213, that AVS 100 waits to detect arrival of the human driven guide vehicle. In some variations, the arrival of the human driven guide vehicle can be implemented passively, by way of for example, the human driven guide vehicle simply driving past and/or near the autonomous vehicle 101. In variations, the human driven guide vehicle may pull over and/or enable the performance of a visual handshake or other exchange by which the autonomous vehicle 101 becomes linked to follow or otherwise track the guide vehicle for a given road segment.

The arrival of the human driven guide vehicle can also detected through a variety of mechanisms (740). In one implementation, the HV interface 240 tracks the position of the guide vehicle, and the position information is communicated by the human driven vehicle guide assistance system 200 to the AVS 100. The human driven vehicle guide assistance system 200 and/or AVS 100 can also include, for example, proximity logic that initiates the autonomous vehicle 101 into performing select operations or facilitating the use of a human driven guide vehicle. By way of example, the autonomous vehicle 101 can start its engine, and/or orient itself so that the vehicle can pull into traffic behind the guide vehicle.

Once the arrival of the guide vehicle is detected, the autonomous vehicle 101 tracks the guide vehicle through a road segment that includes the point where the autonomous vehicle 101 lost its confidence (750). In tracking the guide vehicle, the autonomous vehicle 101 can perform a diverse range of driving operations, including steering to follow (752), pacing to follow (754), and/or ignoring known rules and/or knowledge of the roadway (756), so as to perform an action that would be contrary to what the autonomous vehicle 101 would perform under any other circumstance. In more detail, steering to follow (752) can incorporate actions such as the autonomous vehicle 101 changing lanes and/or turning into a roadway in order to track the route of the guidance vehicle. With reference to FIG. 1, steering to follow can optionally be implemented by using the position information of the guide vehicle as route information 141 which is communicated to the controller 144 for the vehicle interface subsystem 130. Pacing to follow (754) can also incorporate actions such as provided by the autonomous vehicle 101 propelling and braking. The propulsion and/or braking can be performed independent of, or without consideration for proximity to the guide vehicle, which can in fact be more than one car or car length ahead of the autonomous vehicle 101. The pacing to follow configurations may be set to enable the autonomous vehicle 101 to progress through the road segment with the guide vehicle, but different surroundings and/or events can require the autonomous vehicle 101 to have different braking and/or propulsion when maneuvering through the row segment. For example, the guide vehicle can progress through the road segment and miss a large pedestrian traffic group which enters a roadway, meaning the autonomous vehicle 101 has to progress more slowly with stop and go while the guide vehicle can maintain a more steady velocity.

With respect to (756), some variations provide that the AVS 100 maintains driving rules which are default authority when conditions or events require the AVS 100 to make a decision on an action. For example, the AVS 100 can maintain a rule regarding traffic lights, where the vehicle progresses through the traffic light when the light is green, slows to the traffic light if the light turns yellow, and completely stops the traffic light when the light is red. The traffic rule lights may specify that the autonomous vehicle 101 cannot enter an intersection when the traffic light turns red. Likewise, another rule may provide that the autonomous vehicle 101 will not drive on the wrong side of the street and/or on a shoulder or sidewalk of a roadway. Examples recognize that these rules, which the AVS 100 can be trained on, can sometimes conflict with the manner in which a vehicle needs to drive in order to progress through some complex roadway conditions, such as provided by a heavy construction site. Accordingly, the AVS 100 can include a guided mode of operation in which the guide vehicle is authoritative over existing rules and knowledge of the AVS 100. For example, when operating in the guided mode of operation, the autonomous vehicle 101 can ignore traffic lights, veer off road, or drive on the wrong side of the street, as would the human driven guide vehicle.

According to some example, the AVS 100 can also detach (or de-pair) from the human driven guide vehicle once a road segment becomes computationally understandable, and/or the condition or event passes so that the confidence of the AVS 100 returns to a value that is above the safety threshold, and return to the default autonomous mode (760). In one implementation, the determination is made by the AVS 100, which continually monitors the roadway in order to calculate its confidence value for navigating through the roadway on its own. In a variation, the human driven guide vehicle (e.g., the human operator) can determine when the autonomous vehicle 101 should detach from tracking the guide vehicle. For example, human judgment may be used, and the operator of the guide vehicle can select a feature provided on a handset, which can form part of the human driven guide system human vehicle interface system human vehicle interface system 500 (see FIG. 5). Still further, the HV guidance system 200 can determine when the autonomous vehicle 101 and the human driven guide vehicle can detach or separate, based on a determination made as to the condition of the roadway or other information of 20.

With reference to FIG. 8, the HV guidance system 200 can operate as part of a network service which manages or otherwise monitors human driven vehicles of a fleet (810). The monitoring of the human driven vehicles can include identifying the current location of the individual vehicles, as well as a state of operation for each vehicle. The state of operation of each vehicle can identify those vehicles which are on active trips (812), as well as vehicles which are available for use but not on active trips (814). In some variations, the state of use can also identify those vehicles which are on an active trip, but within a designated time or distance threshold to the service location or trip drop-off, at which point the vehicle will no longer be on an active trip. For example, the HV guidance system 200 can identify on active fares with passengers, vehicles which await transport request, and those vehicles which are on active fares, but are within one minute of arriving at a destination or drop-off for the fare. Still further, in some variations, the HV guidance system 200 can identify those vehicles which are active but newly assigned to a fare, so as to be on route to the service location (e.g., to pick up the passenger).

The HV guidance system 200 can receive a guided assistance request, when as described by other examples, the AVS 100 of an autonomous vehicle 101 encounters an event or condition which drops the confidence value of the AVS 100 in its determination of whether the autonomous vehicle 101 can safely progress on its trip (820). In response to receiving the request, the HV guidance system 200 can instruct the autonomous vehicle 101 to drive to a meeting location (822). The instruction can include route information to the meeting location. Additionally, the instructions can include additional actions which the autonomous vehicle 101 is to perform, such as waiting at the meeting location, turning on its lights, parking and available parking spot, or pulling over at a given location which is in a region of the meeting location. Alternatively, the HV guidance system 200 can determine that the autonomous vehicle 101 will be traveling to a portion of a route (e.g., a road segment) that has been identified as being a difficult portion to navigate.

The HV guidance system 200 can select a human driven vehicle from the human resource pool 92 (see FIG. 1) in order to act as the guide in assisting the autonomous vehicle 101 (830). The guide vehicle, the meeting location and/or proximity of a pool of drivers to the meeting place can be determined (832). The selection of the human driven vehicle can be based in a variety of factors, such as described with an example of FIG. 2. Among other factors, a proximity or estimated time of the selected guide vehicle to arrive at the meeting location can form a criteria or component thereof for selecting (834). When, for example, the selected vehicle has an active state, the criteria for selecting the human driven vehicle can include the amount of time or distance which is added to the existing fare of the guide vehicle (e.g., change in the ETA of the fare in progress) (836), as well as the ability of the guide vehicle to complete a current route before heading to the meeting location.

Once the human driven vehicle is selected to guide the autonomous vehicle 101, instructions are sent for that vehicle to drive to the meeting location (840). By way of examples, the instructions can specify that the current fare of the vehicle is not to be interrupted, or that the driver is to complete the fare in progress before heading over to the meeting location.

Figures 11A, 11B, 11C:
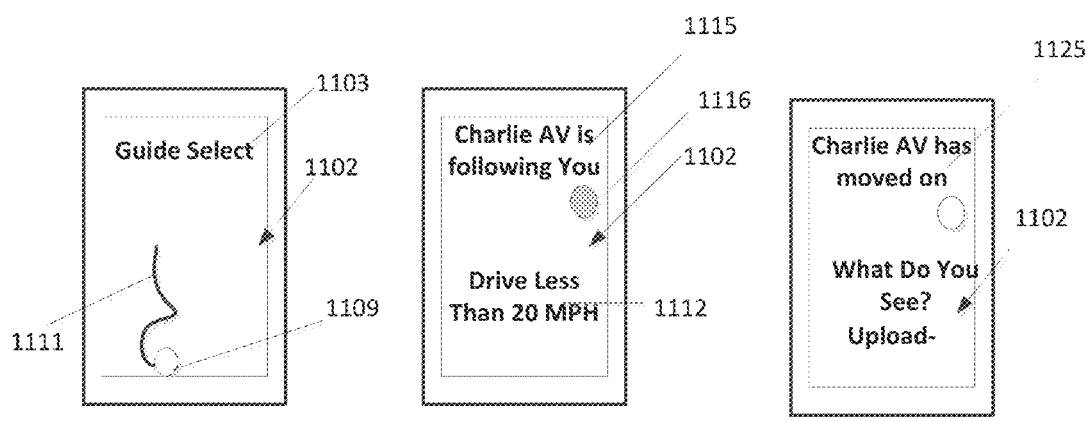
FIG. 11A through FIG. 11C illustrate example interfaces for instructing a human operator to drive a vehicle when guiding an autonomous vehicle.

At the meeting location, the autonomous vehicle 101 can initiate tracking of the human driven guide vehicle (850). The autonomous vehicle 101 can track the guide vehicle in a manner described by, for example, FIG. 7. While the tracking takes place, the human operator of the guide vehicle can be notified that the guide vehicle is being tracked by an autonomous vehicle (852). For example, the human driven guide vehicle system human vehicle interface system human vehicle interface system 500 can include a mobile computing device of the driver, which displays a notification 521 that identifies information about the autonomous vehicle 101, and the state of the autonomous vehicle 101 tracking the guide vehicle (e.g., tracking ongoing, tracking stopped, etc.). FIGS. 11A through 11C show example interfaces of notifications which can be displayed on the human driven guide vehicle system human vehicle interface system human vehicle interface system 500.

With reference to an example of FIG. 9, a driver of one of the HV vehicles of the pool has located a notification which instructs the driver to drive to a meeting location in order to receive guidance for the autonomous vehicle 101 (910). For example, the human driven vehicle can be in progress, or alternatively, on the way to a pickup of the fare, when a notification 521 appears on a screen of a mobile computing device which the driver uses in connection with a transport arrangement service 10. The human driven vehicle can generate an alert, or otherwise communicate position information as it nears or reaches the meeting location (912).

Once the human driven vehicle reaches or passes the meeting location, the human driven vehicle can determine or otherwise be provided a new route segment that passes through the location where the autonomous vehicle 101 encountered the confidence loss (920). For example, if the human driven vehicle is rerouted while it's on an active fare, a new route is calculated for the guide vehicle that passes through the road segment where guidance is to be provided, and then to the service location or drop-off for the current fare.

When the guide vehicle is paired with the autonomous vehicle 101, the human vehicle interface system 500 can receive a notification informing the driver of the presence of the autonomous vehicle 101 (930). In some variations, the driver of the guide vehicle can also receive feedback to promote or facilitate the tracking or following by the autonomous vehicle 101 (932). For example, the driver can be told to slow speed, navigate and pause at a side street, and/or perform other actions to ensure that the autonomous vehicle 101 can track the guide vehicle through the road segment at issue. In some variations, the guide vehicle can also be instructed to operate sensor equipment and/or record information (including orally or through camera operation of an associated mobile computing device) in order to obtain information about the road segment that caused the issue with the autonomous vehicle 101 (934). The HV guide assistance system 200 can process the information provided by the driver in order to further understand the event or condition that caused a loss of confidence by the autonomous vehicle 101. According to various examples, the driver and/or HV guide assistance system 200 can (i) classify the event or condition, (ii) manually identify a pure autonomous vehicle 101 navigation strategy to go through or circumvent the event or condition, and/or (iii) estimate a duration, magnitude or other attribute of the event or condition over time. When the guidance of the autonomous vehicle 101 is complete, the driver of the guide vehicle can receive a notification that the tracking of the autonomous vehicle 101 is over (936).

Figure 10:
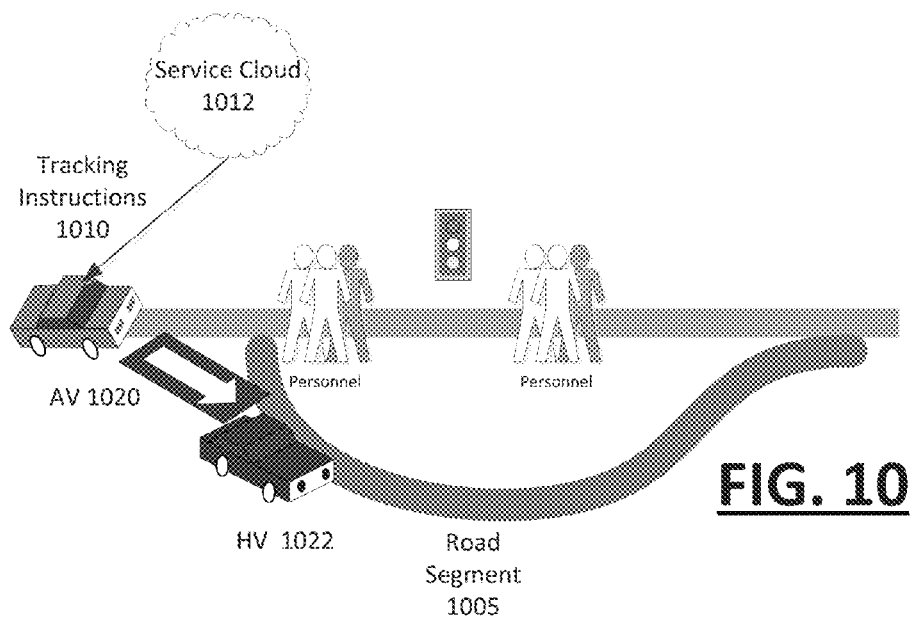
FIG. 10 illustrates an example implementation of a hybrid transport service in which an autonomous vehicle is guided by a human driven vehicle.

FIG. 10 illustrates an example for the use of a human guide vehicle to assist an autonomous vehicle through a roadway segment, according to one or more embodiments. In an example of FIG. 10, an autonomous vehicle 1020 has difficulty with a roadway segment, which includes a road diversion that is temporarily constructed to bypass a crowd of people. The autonomous vehicle 1020 has knowledge of the road segment, in that the autonomous vehicle 1020 may know of a traffic light and also that area adjacent to the roadway is a sidewalk. While the roadway may be known to the autonomous vehicle 1020, in the example provided, the crowd of people in the roadway generate an event or condition for which the AVS 100 of that autonomous vehicle 1020 loses confidence in, resulting in an event request 121 to the HV guidance system 200. The HV guidance system 200 (e.g., illustrated as the service cloud 1012) can select and instruct the human vehicle driver to guide the autonomous vehicle 1020. The HV guidance system 200 can also transmit tracking instructions 1010 to the autonomous vehicle 1020. The autonomous vehicle 1020 may arrive at a meeting location, and the autonomous vehicle 1020 can follow or track the human driven guide vehicle 1022 to the road segment 1005. The autonomous vehicle 1020 can then track the human driven vehicle 1022 to the road segment 1005. In tracking the human driven guide vehicle 1022, the autonomous vehicle 1020 can turn, change lanes, and steer to both avoid road hazards or conditions which are sensed by the sensors of the autonomous vehicle 1020, and also to maintain the road position and location of the human driven guide vehicle 1022. Thus, for example, while the autonomous vehicle 1020 encounters roadway conditions which that human driven vehicle 1022 does not, the autonomous vehicle 1020 will still try and follow the human driven vehicle 1022 along the same path, using the same lane of road and performing the same turns. In some implementations, autonomous vehicle 1020 performs actions such as lane changes, turns and other steering actions at the same position on the roadway as the human driven vehicle 1022. The autonomous vehicle 1020 can also pace at its own determination, while independently adjusting its pace or operation to deal with conditions or events which may not affect the human driven vehicle 1022 in the same way.

Additionally, in tracking the human driven vehicle 1022, the AVS 100 of the autonomous vehicle 1020 can implement a mode in which the human driven vehicle 1022 is authoritative, thereby enabling the AVS 100 to ignore rules and information which the autonomous vehicle 1020 would otherwise rely. For example, the autonomous vehicle 1020 may have information or knowledge of a sidewalk adjacent to the roadway, but in the example for provided, the sidewalk is used to form the roadway AVS 1005. The autonomous vehicle 1020 follows the human driven guide vehicle 1022 despite having knowledge and rules that would otherwise provide that the vehicle is to avoid sidewalks. Because the autonomous vehicle 1020 operates in the alternative guide mode, it can neglect its own rules of driving. Similarly, the traffic light can turn red while the autonomous vehicle 1020 follows the human driven guide vehicle 1022. While the red light event may be detected by AVS 100 of the autonomous vehicle 1020, the mode of operation provides that the autonomous vehicle follows the human driven guide vehicle 1022 rather than obey its own rules of driving.

FIGS. 11A through 11C illustrate example interfaces for instructing a human operator to drive a vehicle when guiding an autonomous vehicle. In the examples provided, the driver of the vehicle providing the guidance to the automated vehicle 101 can be provided communications to inform the driver of status, feedback and/or prompts for information while the driver carries out the role of providing guidance. The display screen 1102 can be provided on a mobile computing device of the driver, which can also correspond to or be part of the human driver interface system 500, such as described with an example of FIG. 5.

In FIG. 11A, a display screen 1102 of the driver displays instructions from a network service which requests the driver to serve as a vehicle guide for an autonomous vehicle. The display screen 1102 displays a message 1103 informing the driver of the driver's selection to serve as the guide for the autonomous vehicle 101. The message 1103 can also be displayed with map content identifying the meeting location 1109 where the driver is to be paired with the autonomous vehicle 101. A route 1111 can be displayed for the driver, indicating, for example, the path to the meeting location and/or the path through the road segment which the autonomous vehicle 101 is unable to navigate. The message 1103 can optionally include or identify an action that the driver is requested to perform in order to have the autonomous vehicle 1101 track the driver's vehicle. By way of example, the driver can be instructed to park and wait for the autonomous vehicle, or to simply drive by the location where the autonomous vehicle is parked.

In FIG. 11B, the display screen 1102 reflects a status after the time when the driver arrives at the meeting location. Accordingly, the display screen 1102 can include a status message 1115 and/or indicator 1116 which informs the driver that the autonomous vehicle 101 is tracking the driver's vehicle. While the autonomous vehicle 101 is tracking, the display screen 1102 can also display feedback 1112 with guidance or instructions on how the driver should drive. For example, the feedback 1112 may be responsive to a measured distance between the autonomous vehicle 101 and the driver's vehicle, and if the autonomous vehicle starts to separate from the driver vehicle, then the driver can be instructed to slow down. As another example, the driver can be instructed to stop or pull over in order to enable the autonomous vehicle to catch up.

In FIG. 11C, the display screen 1102 reflects a status after the time when the autonomous vehicle 101 stops following the driver's vehicle. For example, the driver may receive a route to drive through once the autonomous vehicle initiates tracking, but the driver may have no independent knowledge of when or where the autonomous vehicle 101 stops tracking. The driver notification 1125 on the display screen can confirm that the autonomous vehicle 101 stopped tracking. The driver may continue on a route to a service location after the autonomous vehicle stops tracking.

FIG. 11C also illustrates a variation where the driver of the guide vehicle is used to determine real-time information about the event or condition for which the autonomous vehicle 101 requested assistance on. For example, the driver can be prompted to provide information using voice or text entry, indicating a label or short description of what the driver perceived.

In variations, the driver vehicle is selected for an integrated set of sensor equipment, which the driver can selectively (or continuously deploy). The driver can be prompted to deploy the sensor equipment when driving through the road segment that caused the confidence drop in the autonomous vehicle 101. Once the autonomous vehicle 101 is disengaged, the driver can also be prompted to perform other actions, such as upload data from the sensor equipment or retract the deployed sensor equipment until further notice.

According to some examples, the data collected from the human driven vehicle can include sensor information and/or augmentation from the human driver. By way of example, the HV guide assistance system 20 or other remote service can process or analyze the data from the human driven vehicle. In one implementation, the data can be analyzed so that the event or condition is classified. For example, the classification can label the event or condition as one which other autonomous vehicles should avoid, or alternatively, one which other autonomous vehicles can navigate through but only with advanced instructions or remote guidance. As an addition or alternative, the data can be analyzed to determine one or more attributes of the event or condition, such as an estimated time or duration for when an event or condition is present on the roadway. Various other conditions or events which can affect, for example, performance or health of the autonomous vehicle 101 can also be detected and recorded using the sensor data. For example, newly discovered road hazards, such as potholes can be imaged or otherwise detected through the sensor data and communicated to a remote service. In turn, the sensor data and/or the analyzed outcomes of such data, can be distributed to a fleet of vehicles, including autonomous vehicles. The information can provide the autonomous vehicles with advance information about events or conditions which may affect the autonomous vehicle's ability to navigate, as well as potential hazards which can, for example, damage the autonomous vehicle 101. By way of example, the information can be communicated to other autonomous vehicles as region-specific information from source 217 (e.g., see FIG. 2).

Figure 12:
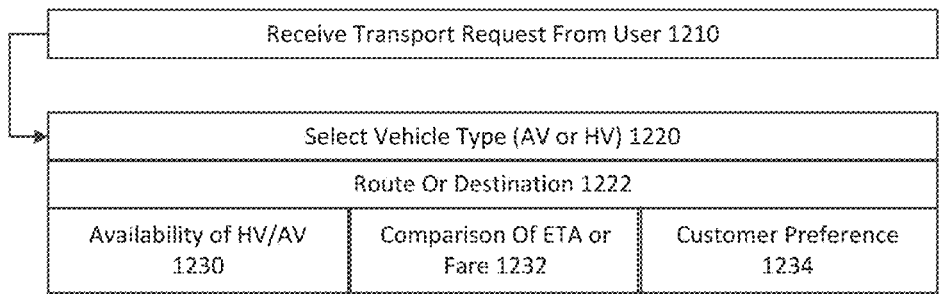
FIG. 12 illustrates an example method for intelligently selecting a vehicle type for a transport service.

Methodology and Examples for Vehicle Type Selection for Transport Arrangement Services FIG. 12 illustrates an example method for intelligently selecting a vehicle type for a providing transport service. An example method such as described with FIG. 12 can be implemented using, for example, a system such as described with an example of FIG. 1 and FIG. 3. Additionally, hardware components and functionality for implementing aspects of a network service for arranging transport services can be implemented using a computer system such as described with an example of FIG. 6. In describing an example of FIG. 12, reference may be made to elements of FIGS. 1, 3, and 6 for purpose of illustrating suitable components and functionality for implementing or performing operations as described.

With reference to FIG. 12, a transport request is received from a user (1210). The transport request may be unspecific to type of vehicle, so that the preference of the user is not indicated. As described with an example of FIG. 12, the preference of the user can optionally be inferred in selecting the vehicle type. As an addition or variation, the selection of the vehicle type (e.g., autonomous vehicle) can be based in part on logistics and/or predictive cost analysis for electing one type of vehicle over another. Still further, in some variations, the user preference can be provided in the transport request or expressed through a setting. However, as further described in variations, the transport arrangement service 10 can provide a recommendation to the user for another vehicle type if the predictive cost analysis and/or logistics merit consideration of the other type of vehicle.

The transport request can be communicated with service location information, such as pickup and/or drop off location for a rider. As described with some other examples, the customer can utilize an application running on a mobile computing device to make the transport request to the transport arrangement service 10. The transport request can specify, for example, the current location of the customer as the service location, or a pin drop location where the service location is to be provided.

In response to receiving the transport request, the transport arrangement service 10 selects a vehicle type and vehicle to fulfill the transport request (1220). According to some examples, in selecting the vehicle and vehicle type, the transport arrangement service 10 determines a preliminary route or destination for the rider (1222). In another example, the transport arrangement service 10 can select the vehicle type based on user-specified preference, user history and/or feedback, and/or user profiling, such as the age of the user, where the user lives, etc. (e.g., younger users may have a propensity to enjoy new technological advances as compared to older riders who like the safety-feel of a human-driven vehicle).

In one implementation, the points of the destination and/or route are then cross-referenced against a map of the region (as provided by the map service 199 of FIG. 2) or region specific information in order to determine whether the selection of an autonomous vehicle 101 would result in a statistically significant or probable likelihood of requiring a deviation from the route or the destination. A deviation can result if the autonomous vehicle 101 being deemed to likely encounter a condition, event or object which it cannot resolve on its own, in which case the autonomous vehicle 101 may need to traverse to a meeting point. With reference to FIG. 3 the 330 can, for example, predict the route of the autonomous vehicle 101, and further estimate the chance of whether a human driven vehicle guide is needed. The statistical determination can be based on, for example, a measure of how frequently past autonomous vehicles 101 require deviation with respect to (i) a region of the drop off location and/or points on the predicted route of the fulfilled transport, or (ii) a condition or event which is likely present on the trip of the transport request. The prediction of whether the autonomous vehicle will require route deviation can also be passed on other probabilistic determinations, including analysis of road conditions or events (without historical analysis), and/or modeling based on vehicle performance and/or conditions or events present.

As another variation, the service location points (or drop off location), as well as routes on an optimal route can be inspected to ensure the autonomous vehicle 101 can traverse through the relevant road segment (1230). For example, if the destination is near construction or heavy pedestrian traffic, a determination can be made that points of the route or destination are inaccessible to the autonomous vehicle 101.

As an addition or alternative, a cost analysis can be performed in order to compare estimated time of arrival (to destination) or alternatively time of trip for each of the vehicle types, including autonomous vehicle type (1232). Even when no deviation is deemed likely for the autonomous vehicle, the time of trip and/or estimated time of arrival for a trip can vary for the autonomous vehicle as compared to the human driven vehicle. For example, because of the cautious nature of the autonomous vehicles, statistical or historical information may indicate such vehicles need more time than human driven counterparts. If the planned or requested trip is sufficiently long enough, the difference in time of trip or ETA can arise to a significant cost which would weight towards the selection of the human driven vehicle. Additionally, if a deviation from an optimal or desired route (or service location) is deemed sufficiently likely, then the time of trip or ETA is determined for the autonomous vehicle with the deviation being included in the calculation.

Fare calculation can also be factored into the selection of the vehicle type. For example, the transport arrangement service 10 may be implemented to automatically select the cheaper vehicle type for the customer unless a preference of the customer is otherwise. Thus, if the customer expresses no preference, but is provided the more expensive of the two transports, the vehicle selection decision would not be supported for business reasons. The fare for the transport of each vehicle type can be estimated using, for example, routing components 340, which can determine the fare for each vehicle type and further perform comparison of the fare types. The fare type for the two vehicle types can deviate from one another based on, for example, the demand for and supply of each vehicle type. Other factors which can affect cost determination include time of travel. If the autonomous vehicle 101 requires, for example, route deviation and/or human driven vehicle guidance, then the time (and cost) for that vehicle type can increase disproportionately as compared to the human driven vehicle. Likewise, route deviation can increase the length of the trip, which can further increase cost. The monetary cost is thus compared between vehicle types in order to make or weight the selection of one vehicle type over another.

Another parameter for facilitating the selection of the vehicle type includes preference of the customer for vehicle type (1234). As an addition or alternative, the preference of the customer can be in the form of time of travel or estimated time of arrival, which directly impacts the vehicle type.

In some implementations, the customer preference is the final selection. In variation, the customer preference can be overruled based on other considerations, such as time of trip or ETA, or overall cost. For example, business rules or considerations may be implemented, such that (i) if the customer has no preference as to vehicle type, then select the vehicle type which is the lowest monetary cost to the customer, unless (ii) the customer has preference to time of travel or ETA, in which case the vehicle type is selected based on time of travel or ETA. Still further, if the customer has preference which indicates one vehicle type selection over the other, the preference can be overruled if staying with the customer's preference increases any one or more of monetary cost or time cost (e.g., ETA) by more than some threshold amount (e.g., 25%).

Methodology and Examples for Autonomous Vehicle to Utilize Remote Assistance

Figure 13:
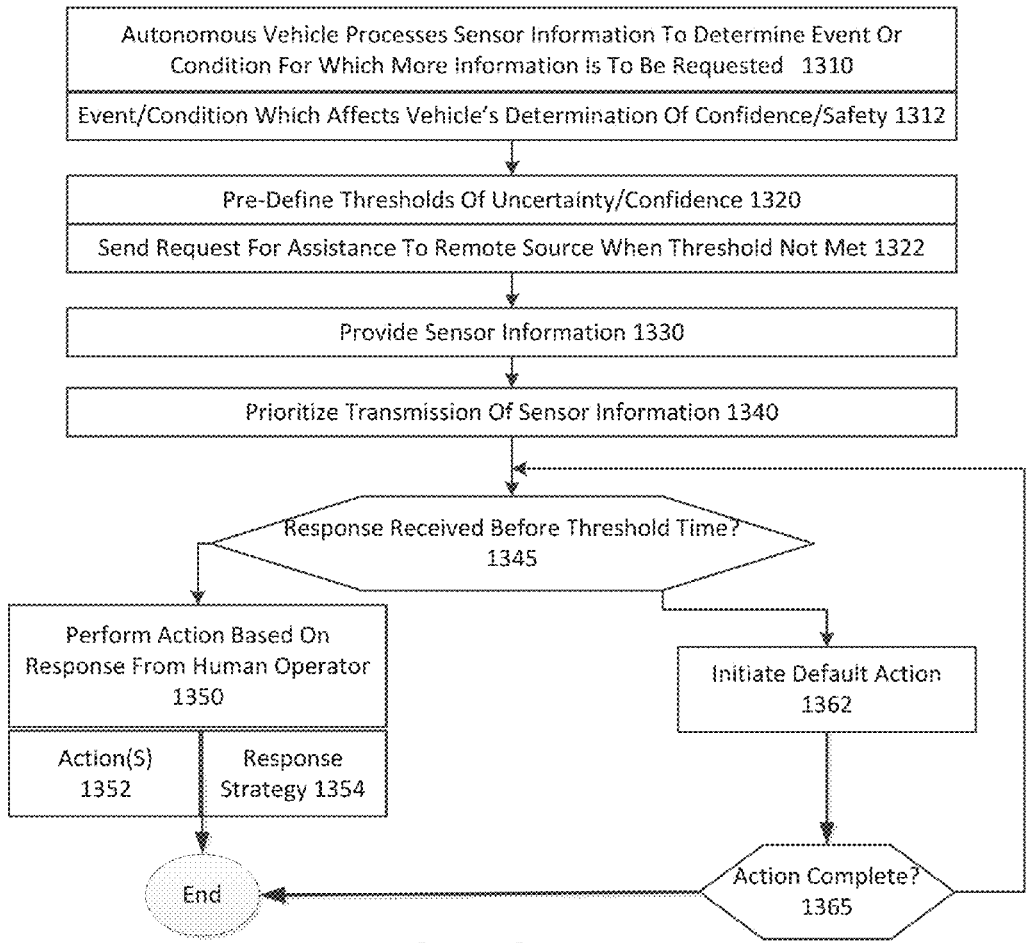
FIG. 13 illustrates an example method for operating an autonomous vehicle to receive assistance from a remote human operator.
Figure 14:
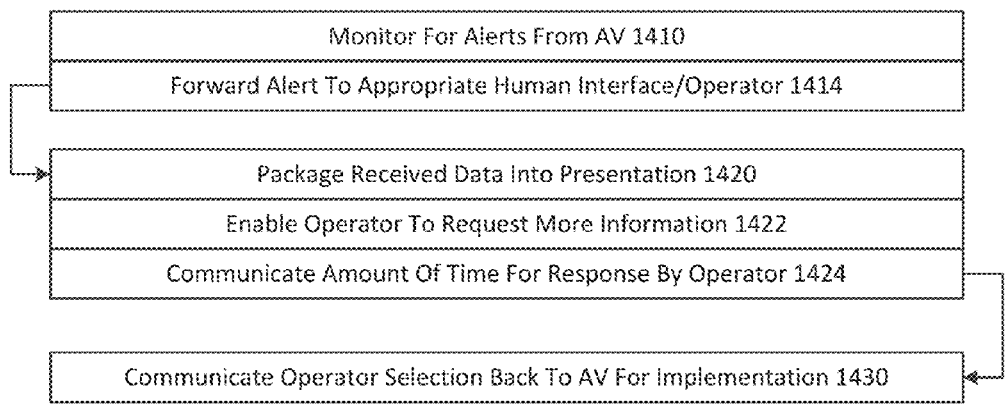
FIG. 14 illustrates an example method for operating a remote service to respond to alerts from an autonomous vehicle.

FIG. 13 illustrates an example method for operating an autonomous vehicle to receive assistance from a remote human operator. FIG. 14 illustrates an example method for operating a remote service to facilitate an autonomous vehicle in navigating an unknown roadway event or condition. An example method such as described with FIG. 13 can be implemented using, for example, an autonomous vehicle 101 such as described with an example of FIG. 1 and FIG. 4. Similarly, an example method such as described with FIG. 14 can be implemented using, for example, a system such as described with an example of FIG. 4. Additionally, hardware components and functionality for implementing aspects of a network service can be implemented using a computer system such as described with an example of FIG. 6. In describing an example of FIG. 13 or FIG. 14, reference may be made to elements of FIG. 1, 4 or 6 for purpose of illustrating suitable components and functionality for implementing or performing operations as described.

With reference to an example of FIG. 13, the autonomous vehicle 101 can process sensor information it receives while on a trip in order to determine an event or condition which the autonomous vehicle 101 needs or is requesting information on (1310). In one aspect, the event or condition affects the vehicle's determination of confidence in its safety (1312). In variations, the event or condition can be one which the autonomous vehicle 101 can handle safely, but the AVS 100 is uncertain on optimal action or how best to handle the event in the future.

The AVS 100 can include a pre-defined threshold level in regards to confidence or certainty when evaluating conditions or events (1320). When the autonomous vehicle 101 encounters an event or condition, an object, event or condition (based on the confidence threshold), which does not meet the threshold, the autonomous vehicle 101 sends an alert to request assistance from a remote source (1322). In some implementations, the alert can be generated in response to the autonomous vehicle 101 having an uncertainty level that exceeds a threshold (or conversely a confidence value that is less than a threshold) with respect to the autonomous vehicle understanding how to safely respond to an event or condition. For example, the alert can be generated in response to the autonomous vehicle being unable to (with sufficient certainty) to recognize an object in the roadway. In examples such as provided by FIG. 4, the request can be sent to a service to receive human operator input.

The request can be communicated or otherwise provided with sensor information to enable the human operator to see what is occurring on the roadway of the autonomous vehicle 101 (1330). For example, image data from one or more multiple cameras of the autonomous vehicle 101 can be used to communicate information to the remote service. The sensor information which is communicated to the remote source can be selected, filtered and/or prioritized for pertinence to the object, event or condition affecting the vehicle's confidence (1340). For example, if a long range camera on the autonomous vehicle 101 detects an unrecognizable object in the road, the sensor data that is communicated to the source includes images from the camera that first detected the object, as well as images from other cameras or sensors which may have subsequently viewed the object.

An example of FIG. 13 recognizes that the time allotted from the remote service for specifying a response is generally a few seconds (e.g., less than 8 seconds), and less than 3 seconds. Accordingly, under one implementation, the AVS 100 makes a determination as to whether a response is received from the remote service before a given threshold of time (1345). The threshold of time can be statically or dynamically predetermined. For example, the threshold time limit for receiving the reply action can be static and set by default, geographic region and/or roadway. Alternatively, the threshold time limit for receiving the reply action can be dynamic, and set by one or more parameters which are measured on-the-fly. For example, the threshold time limit can be set by the velocity of the autonomous vehicle 101 and/or the range of the object, event or condition which is the source of the alert.

If the determination of (1345) is that a response from the remote service (e.g., HARVAS) is received, then the AVS 100 of the autonomous vehicle 101 can perform in accordance with the response received from the remote service (1350). In one implementation, the response can specify an action or non-action that the autonomous vehicle 101 is to perform (1352), such as slow-down immediately, change lanes, or pull over. In a variation, the response communicated from the remote human operator can specify (or modify) a response strategy for the autonomous vehicle 101 (1354). The response strategy can be implemented as, for example, a conditional and/or multi-step instruction. For example, the response strategy can specify that the autonomous vehicle 101 is to perform an action (i) when a particular condition is detected, or (ii) so long as a particular condition is present or true. For example, the response strategy can identify one or more actions "as safe/appropriate strategies to follow" (e.g., "pass in the left lane when a safe passing condition is detected"). Still further, in some variations, the specified action is communicated as an identifier to a predetermined list of actions or strategy options for the autonomous vehicle 101. The specified action can also be communicated as a list of actions (e.g., by identifier), such as when the human operator simulates driving control and veers the vehicle while slowing down. In each of the examples, the communication from the remote service identifies one or more of (i) an action, (ii) set (or sequence of actions), or (iii) response strategy for the AVS 100 in performing one or more actions.

If the threshold time period passes and no response action is received from the remote service, the autonomous vehicle 101 can initiate performance of a default action (1362). For example, the default action when a roadway object is unknown can be to brake moderately so as to slow down. However, different response actions can be performed for different kinds of events, conditions or objects. For example, the default action for when the autonomous vehicle 101 is on the highway can be to brake moderately or change lanes (whichever is more available), while in an urban environment, the default action can be to brake more aggressively, so as to stop altogether.

In some variations, upon initiating performance of the default action, another determination is made as to whether the action initiated by default is complete, and/or the unknown object, event or condition is resolved (1365). If the unknown object, event or condition is still present, the process repeats to the determination (1345) in determining whether a response was received from the remote service. For example, the response from the remote service can be received after the threshold time limit, but before the default action is complete. For example, the autonomous vehicle 101 can initiate braking and slow down, then receive the reply from the remote service.

As an alternative or variation, when the default action is performed, another threshold duration of time can be measured before the autonomous vehicle 101 performs the action again (e.g., brake and slow down again) or performs the action more severely (e.g., brake and stop). A determination of (1355) can include determining whether more action is needed, and then performing either the default action or the action specified by the remote service.

With reference to FIG. 14, a remote service operates to monitor for alerts from autonomous vehicle 101 (1410). When an alert is received, the remote service identifies the vehicle that is the source of the transmission, and then forwards the alert to a human interface component 434 accordingly (1414). A human operator can operate the interface, and in one implementation, the human operator interface component 434 is assigned to just one vehicle (or to a limited set of vehicles). In this way, the alert 413, for example, is communicated to a human operator who has information or knowledge about the transmitting vehicle and/or the particular trip the vehicle is on (e.g., the geographic region or roadway).

According to one implementation, the received data from the autonomous vehicle 101 is packaged into a presentation, which may include one or more menu options from which the human operator can make selection (1420). For example, a menu option can provide options as to how the autonomous vehicle 101 is to respond to an object in the road (e.g., veer left/right, slow down and avoid, ignore, etc.). The presentation can overlay the menu options over content generated from the sensor information (e.g., long range camera or video). The presentation provided to the human operator can also include a feature to enable the human operator to request more information from the autonomous vehicle 101 (1422). For example, the operator can request more images, images from different cameras or cameras which are oriented differently, or map information for the vehicle. Still further, in some variations, the information presented to the human operator can identify an amount of time remaining for the human operator to provide a response (before default action is taken) (1424).

From the presentation, the human operator makes the selection (e.g., of the menu options). The selection is communicated back to the autonomous vehicle 101 which signaled the alert 413 (1430). The selection can then be interpreted on the autonomous vehicle 101, where it is acted upon. As mentioned with other examples, absent selection from the human operator, the autonomous vehicle 101 may perform a default action, such as moderately braking. Among other benefits by some examples, the action specified by the human operator can eliminate or reduce braking from the autonomous vehicle 101, so as to improve the riding experience of the passenger.

Figure 15:
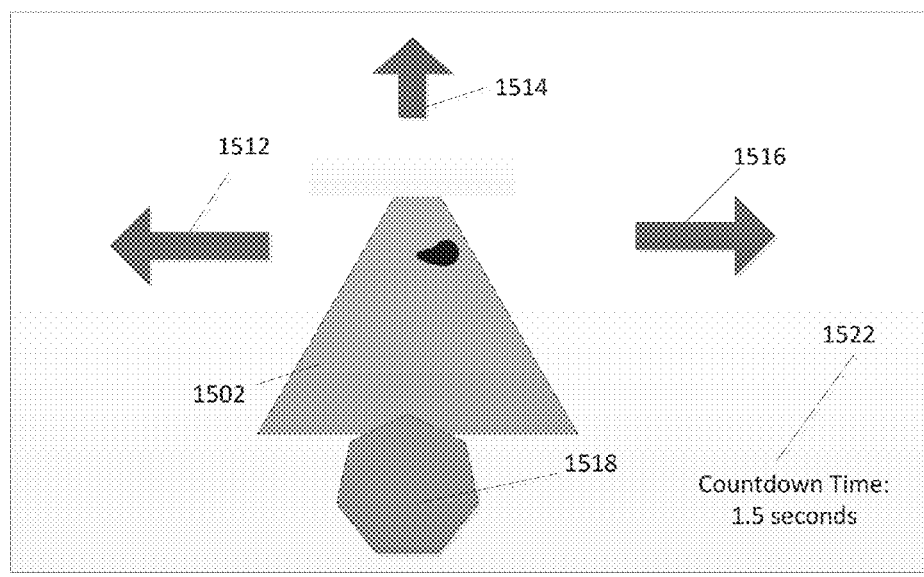
FIG. 15 illustrates an example human interfaces for enabling a human operator to provide a prompt input to facilitate operation of an autonomous vehicle when an event or condition affecting a confidence in safety is detected.

FIG. 15 illustrates an example human interface for a remote service such as described with examples of FIG. 4 and FIG. 14. An example interface 1500 can, for example, correspond to the human operator interface component 434, as modified with the pre-response menu logic 450. As shown, the human operator can be provided one or more images or image content 1502 (e.g., video, image frames of video, etc.), with icons representing action items. In the example provided, the image content 1502 reflects a roadway with an unidentified object. The icons can be individually selectable to enable the human operator to provide selection input to indicate an adjustment in direction or velocity for the autonomous vehicle. The selection input of the operator can be in response to the human operator's perception of the event or object which has a resulted in the uncertainty by the autonomous vehicle.

As an addition or alternative, the interface 1500 can include one or more mechanical elements that enable the human operator to have varying degrees of driving control over the autonomous vehicle 101. For example, the mechanical elements of interface 1500 can include a joy stick (or joy stick combination), wheels, levers or other hand controls to enable, for example, directional guidance, speed control, sensor control (e.g., directional control for cameras or viewing angle) or other vehicle movements or control. As an addition or alternative, mechanical elements of interface 1500 can include foot controls or pedals, which can operator to, for example, provide speed control and/or vehicle stoppage.

FIG. 15 illustrates an implementation in which the icons are directional, to reference a directional action that the autonomous vehicle 101 is to take. In an example of FIG. 15, directional arrows 1512, 1514, 1516 indicate the autonomous vehicle 101 is to veer left or right or move forward. Another feature 1518 can indicate that the autonomous vehicle should stop or brake to slow down. For example, feature 1518 can be pressed repeatedly or continuously to indicate duration and/or severity of braking. A timing feature 1522 can indicate an amount of time remaining until the autonomous vehicle 101 starts to take the default action. Another feature can be dedicated to "no action" so that the selection of the feature signals that the autonomous vehicle 101 is to make null adjustment in direction or velocity because of a detected object. In variations, the icons can be used to request more information, or to perform alternative actions which may be outside of the menu presentation.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A system for arranging transport, the system comprising:
    a memory that stores a set of instructions;
    one or more processors which use the set of instructions to:
        receive a transport request from a user; and
        determine, based at least in part on information specified with the transport request, whether to fulfill the transport request using an autonomous vehicle.

2. The system of claim 1, wherein the information specified with the transport request includes a pickup location.

3. The system of claim 1, wherein the one or more processors determine whether to fulfill the transport request using the autonomous vehicle based at least in part on a preference of the user.

4. The system of claim 3, wherein the preference of the user includes a setting, in a customer profile stored with the system, to prefer autonomous vehicles or human-driven vehicles.

5. The system of claim 3, wherein the one or more processors determine the preference of the user from recent types of vehicles which provided transport services for the user, such as a number of times the user received or specifically requested autonomous vehicles or human-driven vehicles.

6. The system of claim 3, wherein the one or more processors determine the preference of the user from rating information the user provided for past transport services.

7. The system of claim 1, wherein the one or more processors determine whether to fulfill the transport request using the autonomous vehicle based at least in part on one or more special requests made by the user with the transport request.

8. The system of claim 1, wherein the one or more processors determine whether to fulfill the transport request using the autonomous vehicle based at least in part on an estimated cost of fulfilling the transport request with the autonomous vehicle.

9. The system of claim 8, wherein the estimated cost incorporates probabilistic determinations as to whether the autonomous vehicle may encounter a delay or deviation in a route while fulfilling the transport request.

10. The system of claim 8, wherein the estimated cost of fulfilling the transport request using the autonomous vehicle includes a monetary cost to the user, a cost basis for a transport provider, and/or a lost opportunity cost for the user and the transport provider.

11. The system of claim 8, wherein the one or more processors compare the estimated cost of fulfilling the transport request using the autonomous vehicle with a cost of fulfilling the transport request using a human-driven vehicle.

12. The system of claim 11, wherein the estimated cost of fulfilling the transport request using the autonomous vehicle and the cost of fulfilling the transport request using a human-driven vehicle are based on a current supply and demand for autonomous vehicles and human-driven vehicles in a geographic region of the user.

13. The system of claim 1, wherein the one or more processors determine whether to fulfill the transport request using the autonomous vehicle based at least in part on (i) determining one or more routes for the autonomous vehicle to a destination, and (ii) comparing the one or more routes to an optimal route that can be provided by a human-driven vehicle.

14. The system of claim 13, wherein the one or more processors determine whether to fulfill the transport request using the autonomous vehicle based at least in part on comparing a lowest estimated time of arrival for the autonomous vehicle with a lowest estimated time of arrival for the human-driven vehicle.

15. The system of claim 13, wherein the one or more processors determine whether to fulfill the transport request using the autonomous vehicle based at least in part on comparing a distance traveled to the destination for the autonomous vehicle with a distance traveled to the destination for the human-driven vehicle.

16. The system of claim 13, wherein the one or more processors determine whether to fulfill the transport request using the autonomous vehicle based at least in part on comparing a road type for a selected route of the autonomous vehicle with a road type for a selected route of the human-driven vehicle.

17. The system of claim 1, wherein the one or more processors use the set of instructions to:
    determine one of a pickup location or alternative destination for the transport request in order to (i) determine a route that accommodates an ability of the autonomous vehicle, (ii) reduce an estimated time of arrival in using the autonomous vehicle for the transport request, and/or (iii) reduce a distance traveled in using the autonomous vehicle for the transport request.

18. The system of claim 1, wherein the one or more processors use the set of instructions to:
    transmit a message to the user, the message including a selection of a vehicle type to fulfill the transport request;
    receive, from the user, an alternative selection for a different vehicle type;
    and
    fulfill the transport request using the different vehicle type specified in the alternative selection.

19. A method for arranging transport, the method being implemented by one or more processors and comprising:
    receiving a transport request from a user; and
    determining, based at least in part on information specified with the transport request, whether to fulfill the transport request using an autonomous vehicle.

20. The method of claim 19, wherein the information specified with the transport request includes a pickup location.

21. The method of claim 19, wherein the one or more processors determine whether to fulfill the transport request using the autonomous vehicle based at least in part on a preference of the user.

22. The method of claim 21, wherein the preference of the user includes a setting in a customer profile to prefer autonomous vehicles or human-driven vehicles.

23. The method of claim 21, wherein the one or more processors determine the preference of the user from recent types of vehicles which provided transport services for the user, such as a number of times the user received or specifically requested autonomous vehicles or human-driven vehicles.

24. The method of claim 21, wherein the one or more processors determine the preference of the user from rating information the user provided for past transport services.

25. The method of claim 19, wherein the one or more processors determine whether to fulfill the transport request using the autonomous vehicle based at least in part on one or more special requests made by the user with the transport request.

26. The method of claim 19, wherein the one or more processors determine whether to fulfill the transport request using the autonomous vehicle based at least in part on an estimated cost of fulfilling the transport request with the autonomous vehicle.

27. The method of claim 26, wherein the estimated cost incorporates probabilistic determinations as to whether the autonomous vehicle may encounter a delay or deviation in a route while fulfilling the transport request.

28. The method of claim 26, wherein the estimated cost of fulfilling the transport request using the autonomous vehicle includes a monetary cost to the user, a cost basis for a transport provider, and/or a lost opportunity cost for the user and the transport provider.

29. The method of claim 26, wherein the one or more processors compare the estimated cost of fulfilling the transport request using the autonomous vehicle with a cost of fulfilling the transport request using a human-driven vehicle.

30. The method of claim 29, wherein the estimated cost of fulfilling the transport request using the autonomous vehicle and the cost of fulfilling the transport request using a human-driven vehicle are based on a current supply and demand for autonomous vehicles and human-driven vehicles in a geographic region of the user.

31. The method of claim 19, wherein the one or more processors determine whether to fulfill the transport request using the autonomous vehicle based at least in part on (i) determining one or more routes for the autonomous vehicle to a destination, and (ii) comparing the one or more routes to an optimal route that can be provided by a human-driven vehicle.

32. The method of claim 31, wherein the one or more processors determine whether to fulfill the transport request using the autonomous vehicle based at least in part on comparing a lowest estimated time of arrival for the autonomous vehicle with a lowest estimated time of arrival for the human-driven vehicle.

33. The method of claim 31, wherein the one or more processors determine whether to fulfill the transport request using the autonomous vehicle based at least in part on comparing a distance traveled to the destination for the autonomous vehicle with a distance traveled to the destination for the human-driven vehicle.

34. The method of claim 31, wherein the one or more processors determine whether to fulfill the transport request using the autonomous vehicle based at least in part on comparing a road type for a selected route of the autonomous vehicle with a road type for a selected route of the human-driven vehicle.

35. The method of claim 19, further comprising:
determining one of a pickup location or alternative destination for the transport request in order to (i) determine a route that accommodates an ability of the autonomous vehicle, (ii) reduce an estimated time of arrival in using the autonomous vehicle for the transport request, and/or (iii) reduce a distance traveled in using the autonomous vehicle for the transport request.

36. The method of claim 19, further comprising:
transmitting a message to the user, the message including a selection of a vehicle type to fulfill the transport request;
receiving, from the user, an alternate selection for a different vehicle type; and
fulfilling the transport request using the different vehicle type specified in the alternate selection.

37. A non-transitory computer-readable medium that stores instructions, which when executed by one or more processors, cause the one or more processors to perform operations comprising:
receiving a transport request from a user; and
determining, based at least in part on information specified with the transport request, whether to fulfill the transport request using an autonomous vehicle.

38. The non-transitory computer-readable medium of claim 37, wherein the information specified with the transport request includes a pickup location.

39. The non-transitory computer-readable medium of claim 37, wherein the one or more processors determine whether to fulfill the transport request using the autonomous vehicle based at least in part on a preference of the user.

40. The non-transitory computer-readable medium of claim 39, wherein the preference of the user includes a setting in a customer profile to prefer autonomous vehicles or human-driven vehicles.

41. The non-transitory computer-readable medium of claim 39, wherein the one or more processors determine the preference of the user from recent types of vehicles which provided transport services for the user, such as a number of times the user received or specifically requested autonomous vehicles or human-driven vehicles.

42. The non-transitory computer-readable medium of claim 39, wherein the one or more processors determine the preference of the user from rating information the user provided for past transport services.

43. The non-transitory computer-readable medium of claim 37, wherein the one or more processors determine whether to fulfill the transport request using the autonomous vehicle based at least in part on one or more special requests made by the user with the transport request.

44. The non-transitory computer-readable medium of claim 37, wherein the one or more processors determine whether to fulfill the transport request using the autonomous vehicle based at least in part on an estimated cost of fulfilling the transport request with the autonomous vehicle.

45. The non-transitory computer-readable medium of claim 44, wherein the estimated cost incorporates probabilistic determinations as to whether the autonomous vehicle may encounter a delay or deviation in a route while fulfilling the transport request.

46. The non-transitory computer-readable medium of claim 44, wherein the estimated cost of fulfilling the transport request using the autonomous vehicle includes a monetary cost to the user, a cost basis for a transport provider, and/or a lost opportunity cost for the user and the transport provider.

47. The non-transitory computer-readable medium of claim 44, wherein the one or more processors compare the estimated cost of fulfilling the transport request using the autonomous vehicle with a cost of fulfilling the transport request using a human-driven vehicle.

48. The non-transitory computer-readable medium of claim 47, wherein the estimated cost of fulfilling the transport request using the autonomous vehicle and the cost of fulfilling the transport request using a human-driven vehicle are based on a current supply and demand for autonomous vehicles and human-driven vehicles in a geographic region of the user.

49. The non-transitory computer-readable medium of claim 37, wherein the one or more processors determine whether to fulfill the transport request using the autonomous vehicle based at least in part on (i) determining one or more routes for the autonomous vehicle to a destination, and (ii) comparing the one or more routes to an optimal route that can be provided by a human-driven vehicle.

50. The non-transitory computer-readable medium of claim 49, wherein the one or more processors determine whether to fulfill the transport request using the autonomous vehicle based at least in part on comparing a lowest estimated time of arrival for the autonomous vehicle with a lowest estimated time of arrival for the human-driven vehicle.

51. The non-transitory computer-readable medium of claim 49, wherein the one or more processors determine whether to fulfill the transport request using the autonomous vehicle based at least in part on comparing a distance traveled to the destination for the autonomous vehicle with a distance traveled to the destination for the human-driven vehicle.

52. The non-transitory computer-readable medium of claim 49, wherein the one or more processors determine whether to fulfill the transport request using the autonomous vehicle based at least in part on comparing a road type for a selected route of the autonomous vehicle with a road type for a selected route of the human-driven vehicle.

53. The non-transitory computer-readable medium of claim 37, wherein the one or more processors use the instructions to:

determine one of a pickup location or alternative destination for the transport request in order to (i) determine a route that accommodates an ability of the autonomous vehicle, (ii) reduce an estimated time of arrival in using the autonomous vehicle for the transport request, and/or (iii) reduce a distance traveled in using the autonomous vehicle for the transport request.

54. The non-transitory computer-readable medium of claim 37, wherein the one or more processors use the instructions to:

transmit a message to the user, the message including a selection of a vehicle type to fulfill the transport request;

receive, from the user, an alternative selection for a different vehicle type; and fulfill the transport request using the different vehicle type specified in the alternative selection.

* * * * *